(12) United States Patent
Jutras et al.

(10) Patent No.: US 12,535,481 B2
(45) Date of Patent: Jan. 27, 2026

(54) BORRELIA BURGDORFERI PEPTIDOGLYCAN AS A DIAGNOSTIC AND TARGET FOR THERAPEUTIC INTERVENTION OF LYME DISEASE-RELATED PATHOLOGIES

(71) Applicant: VIRGINIA TECH INTELLECTUAL PROPERTIES, INC., Blacksburg, VA (US)

(72) Inventors: Brandon L. Jutras, Blacksburg, VA (US); Christine Jacobs-Wagner, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 1118 days.

(21) Appl. No.: 17/341,201

(22) Filed: Jun. 7, 2021

(65) Prior Publication Data

US 2021/0364514 A1 Nov. 25, 2021

Related U.S. Application Data

(63) Continuation of application No. PCT/US2019/064664, filed on Dec. 5, 2019.

(60) Provisional application No. 62/775,709, filed on Dec. 5, 2018.

(51) Int. Cl.
| | | |
|---|---|---|
| *G01N 33/569* | (2006.01) | |
| *A61K 38/48* | (2006.01) | |
| *A61K 39/40* | (2006.01) | |
| *A61K 45/06* | (2006.01) | |
| *C07K 16/12* | (2006.01) | |
| *G01N 33/68* | (2006.01) | |

(52) U.S. Cl.
CPC ........ *G01N 33/56911* (2013.01); *A61K 38/48* (2013.01); *A61K 39/40* (2013.01); *A61K 45/06* (2013.01); *C07K 16/1203* (2013.01); *G01N 33/686* (2013.01); *G01N 2333/195* (2013.01); *G01N 2400/02* (2013.01); *G01N 2800/26* (2013.01)

(58) Field of Classification Search
None
See application file for complete search history.

(56) References Cited

U.S. PATENT DOCUMENTS

| | | |
|---|---|---|
| 4,044,126 A | 8/1977 | Cook et al. |
| 4,364,923 A | 12/1982 | Cook et al. |
| 4,414,209 A | 11/1983 | Cook et al. |
| 5,709,874 A | 1/1998 | Hanson et al. |
| 5,759,542 A | 6/1998 | Gurewich |
| 5,840,674 A | 11/1998 | Yatvin et al. |
| 5,860,957 A | 1/1999 | Jacobsen et al. |
| 5,900,252 A | 5/1999 | Calanchi et al. |
| 5,948,433 A | 9/1999 | Berteck |
| 5,972,366 A | 10/1999 | Haynes et al. |
| 5,983,134 A | 11/1999 | Ostrow |
| 5,985,307 A | 11/1999 | Hanson et al. |
| 5,985,317 A | 11/1999 | Venkateshwaran et al. |
| 6,004,534 A | 12/1999 | Langer et al. |
| 6,010,715 A | 1/2000 | Wick et al. |
| 6,024,975 A | 2/2000 | D'Angelo et al. |
| 6,039,975 A | 3/2000 | Shah et al. |
| 6,048,736 A | 4/2000 | Kosak |
| 6,060,082 A | 5/2000 | Chen et al. |
| 6,071,495 A | 6/2000 | Unger et al. |
| 6,120,751 A | 9/2000 | Unger |
| 6,131,570 A | 10/2000 | Schuster et al. |
| 6,139,865 A | 10/2000 | Friend et al. |
| 6,167,301 A | 12/2000 | Flower et al. |
| 6,253,872 B1 | 7/2001 | Neumann |
| 6,256,533 B1 | 7/2001 | Yuzhakov et al. |
| 6,261,595 B1 | 7/2001 | Stanley et al. |
| 6,267,983 B1 | 7/2001 | Fujii et al. |
| 6,271,359 B1 | 8/2001 | Norris et al. |
| 6,274,552 B1 | 8/2001 | Tamarkin et al. |
| 6,316,652 B1 | 11/2001 | Steliou |
| 2004/0014194 A1 | 1/2004 | Beyer et al. |
| 2010/0184086 A1 | 7/2010 | Callister |

(Continued)

FOREIGN PATENT DOCUMENTS

| | | |
|---|---|---|
| CA | 1218299 A | 2/1987 |
| WO | 9852976 A1 | 11/1998 |

(Continued)

OTHER PUBLICATIONS

Gupta et al. PLoS Pathog. 2020. 16(11): e1009030. (Year: 2020).*

(Continued)

*Primary Examiner* — Anne M. Gussow
*Assistant Examiner* — Brianna K Swartwout
(74) *Attorney, Agent, or Firm* — Carin R. Miller; Lex Generalis, LLC

(57) ABSTRACT

The present disclosure relates to a method of diagnosing Lyme disease in a subject comprising measuring the level of *B. burgdorferi* peptidoglycan or the level of an antibody that specifically binds to *B. burgdorferi* peptidoglycan ("anti-peptidoglycan agent"). The present disclosure also relates to a method of treating a Lyme disease in a subject in need thereof comprising administering to the subject an antagonist against *B. burgdorferi* peptidoglycan (e.g., an anti-peptidoglycan antibody or a peptidoglycan-specific hydrolase). Antagonists (e.g., anti-peptidoglycan antibodies) suitable for the present methods are also disclosed.

9 Claims, 20 Drawing Sheets

(56) References Cited

U.S. PATENT DOCUMENTS

| | | |
|---|---|---|
| 2010/0278866 A1 | 11/2010 | Barbour et al. |
| 2012/0100140 A1 | 4/2012 | Reyes et al. |
| 2018/0246095 A1* | 8/2018 | Zhang .................... C12Q 1/689 |

FOREIGN PATENT DOCUMENTS

| | | |
|---|---|---|
| WO | 0034317 A1 | 6/2000 |
| WO | 2014070117 A1 | 5/2014 |

OTHER PUBLICATIONS

Maekawa et al. Nat Comm. 2016. 7:11813 (Year: 2016).*

Doppenberg-Oosting. Dissertation. 2013. Radboud University Nijmegen Medical Center, The Netherlands. (Year: 2013).*

Human Genome Nomenclature Committee. Peptidoglycan recognition proteins (PGLYRP). 2024. Retrieved from the internet on Aug. 8, 2024 from <URL: https://www.genenames.org/data/genegroup/#!/group/1397> (Year: 2024).*

Singh et al. Clin Microbiol Infect. 2006. 12:705-717. (Year: 2006).*

Uniprot. NOD2_Human: Entry history. Nov. 7, 2018. Retrieved Aug. 8, 2024 online from <https://www.uniprot.org/> (Year: 2018).*

Uniprot. PGLYRP1_Human: Entry history. Nov. 7, 2018. Retrieved Aug. 8, 2024 online from <https://www.uniprot.org/> (Year: 2018).*

Vollmer et al. FEMS Microbiol Rev. 2008. 32:149-167 (Year: 2008).*

"International Search Report and Written Opinion issued by the United States Patent and Trademark Office, as International Searching Authority on Feb. 27, 2020 for PCT/US2019/064664."

Jutras, B.L., et al., "Lyme disease and relapsing fever Borrelia elongate through zones of peptidoglycan synthesis that mark division sites of daughter cells", Proc Natl Acad Sci U S A., vol. 113, No. 33, pp. 9162-9170, Published: Aug. 9, 2016.

Chou, S., et al., "Transferred interbacterial antagonism genes augment eukaryotic innate immune function", Nature, vol. 518, No. 7537, pp. 98-101, Published: Feb. 5, 2015.

Jutras, B.L., et al., "Borrelia burgdorferi peptidoglycan is a persistent antigen in patients with Lyme arthritis", Proc Natl Acad Sci U S A., vol. 116, No. 27, pp. 13498-13507, Published: Jul. 2, 2019.

Takacs, C., et al., "Fluorescent Proteins, Promoters, and Selectable Markers for Applications in the Lyme Disease Spirochete Borrelia burgdorferi", Appl Environ Microbiol., vol. 84, No. 24, pp. e01824-18, Accepted manuscript posted online: Oct. 12, 2018.

Wergeland, H., et al., "Antibodies to various bacterial cell wall peptidoglycans in human and rabbit sera.", vol. 25, No. 3, pp. 540-545, Accepted: Nov. 24, 1986.

Aguero-Rosenfeld, et al., "Diagnosis of Lyme Borreliosis," Clin Microbiol Rev, vol. 18, pp. 484-509, Jul. 2005.

Centers for Disease Control and Prevention, "Notice to Readers Recommendations for test performance and interpretation from the second national conference on serologic diagnosis of Lyme disease," MMWR, vol. 44, No. 31, pp. 590-591, Aug. 11, 1995.

Kingry LC et al., "Whole Genome Sequence and Comparative Genomics of the Novel Lyme Borreliosis Causing Pathogen, Borrelia mayonii," PLoS One, vol. 11:e0168994, pp. 1-21, Published: Dec. 28, 2016.

Wilske et al., "Diversity of OspA and OspC among cerebrospinal fluid isolates of Borrelia burgdorferi sensu lato from patients with neuroborreliosis in Germany," Med Microbiol Immunol., vol. 184, No. 4, pp. 195-201.

Wilske et al., "An OspA Serotyping System for Borrelia burgdorferi Based on Reactivity with Monoclonal Antibodies and OspA Sequence Analysis," J Clin Microbiol., vol. 31, pp. 340-350, Accepted Nov. 20, 1992.

Liang et al., An Immunodominant Conserved Region Within the Variable Domain of VlSE, the Variable Surface Antigen of Borrelia burgdorferi, J Immunol., vol. 163, pp. 5566-5573 (1999).

Gomes-Solecki, et al., "Epitope Length, Genospecies Dependency, and Serum Panel Effect in the IR6 Enzyme-Linked Immunosorbent Assay for Detection of Antibodies to Borrelia burgdorferi," Clin Vaccine Immunol., vol. 14, pp. 875-879 (2007).

Krupka et al., "*Borrelia burgdorferi Sensu lato* Species in Europe Induce Diverse Immune Responses against C6 Peptides in Infected Mice," Clin Vaccine Immunol., vol. 16, pp. 1546-1562 (2009).

Benach et al., Spirochetes Isolated From the Blood of Two Patients With Lyme Disease, N Engl J Med., vol. 308, pp. 740-742 (1983).

Nadelman et al., "Differentiation of Reinfection from Relapse in Recurrent Lyme Disease," N Engl J Med., vol. 367, No. 20, pp. 1883-1890, Nov. 15, 2012.

Hilton et al., Seroprevalence and Seroconversion for Tick-Borne Diseases in a High-Risk Population in the Northeast United States, Am J Med, vol. 106, pp. 404-409 (1999).

Mukherjee et al., "NOD1 and NOD2 in inflammation, immunity and disease," Arch. Biochem. Biophys, vol. 670, pp. 69-81 Available online Dec. 19, 2018.

Johnson et al., Taxonomy of the Lyme Disease Spirochetes,: Yale J Biol Med., vol. 57, pp. 529-537.

Rosa, P.A., et al., "The Burgeoning Molecular Genetics of the Lyme Disease Spirochaete," Nat Rev Microbiol., vol. 3, No. 2, pp. 129-143 (Feb. 2005).

Brusca, J. et al., "Localization of Outer Surface Proteins A and B in Both the Outer Membrane and Intracellular Compartments of Borreliaburgdorferi," J. Bacteriol., vol. 173, pp. 8004-8008, Accepted Oct. 16, 1991.

Barbour, A. G., et al., "Lyme Disease Spirochetes and Ixodid Tick Spirochetes Share a Common Surface Antigenic Determinant Defined by a Monoclonal Antibody," Infection & Immunity, vol. 41, No. 2, pp. 795-804, Accepted May 10, 1983.

Howe, T. R., et al., "A Single Recombinant Plasmid Expressing Two Major Outer Surface Proteins of the Lyme Disease Spirochete," Science, vol. 227, pp. 645-646, accepted Oct. 30, 1984.

Höltje, J.V., "Growth of the Stress-Bearing and Shape-Maintaining Murein Sacculus *of Escherichia coli*," Microbiol Mol Biol Rev., vol. 62, No. 1), pp. 181-203 (Mar. 1998).

Park JT, Uehara, "How Bacteria Consume Their Own Exoskeletons (Turnover and Recycling of Cell Wall Peptidoglycan)," T Microbiol Mol Biol Rev., vol. 72, No. 2, pp. 211-227 (Jun. 2008).

Girardin et al., "Nod2 Is a General Sensor of Peptidoglycan through Muramyl Dipeptide (MDP) Detection," J. Biol Chem., vol. 278, No. 11, pp. 8869-8872, Published, JBC Papers in Press, Jan. 13, 2003.

Park and Uehara, "How Bacteria Consume Their Own Exoskeletons (Turnover and Recycling of Cell Wall Peptidoglycan)," Microbiol Mol Rev., vol. 72, pp. 211-227 (Jun. 2008).

Tigno-Aranjuez et al., "Inhibition of RIP2's tyrosine kinase activity limits NOD2-driven cytokine responses," Genes Dev vol. 24, No. 23, pp. 2666-2677, revised version accepted Oct. 13, 2010.

* cited by examiner

*B. burgdorferi* sheds muropeptides into its extracelluar enviorment.

[Chromatogram: Signal intensity ($A_{205}$) vs Retention time (min), with peaks labeled 1, 2, *, 3, 4, 5, 6, 7, 8, 9, 10, 11]

1
MurNAc(r)
|
L-Ala
|
D-Glu
|
L-Orn–Gly

2
GlcNAc–MurNAc(r)
|
L-Ala
|
D-Glu
|
L-Orn–Gly

3
HexNAc–GlcNAc–MurNAcAnh
|
L-Ala
|
D-Glu
|
L-Orn–Gly

4 & 7 (isomers)
GlcNAc–MurNAcAnh
|
L-Ala
|
D-Glu
|
L-Orn–Gly

5
GlcNAc–MurNAc(r)–GlcNAc–MurNAc(r)
|                                    |
L-Ala                              L-Ala
|                                    |
D-Glu                              D-Glu
|                                    |
L-Orn–Gly                     L-Orn–Gly

6
MurNAc(r)
|
L-Ala
|
D-Glu
|
L-Orn–Gly–D-Ala
                |
           L-Orn–Gly
                |
              D-Glu
                |
              L-Ala
                |
           MurNAc(r)

8
MurNAc(r)
|
L-Ala
|
D-Glu
|
L-Orn–Gly–D-Ala
                |
           L-Orn–Gly
                |
              D-Glu
                |
              L-Ala
                |
       GlcNAc–MurNAc(r)

9
GlcNAc–MurNAc(r)
|
L-Ala
|
D-Glu
|
L-Orn–Gly–D-Ala
                |
           L-Orn–Gly
                |
              D-Glu
                |
              L-Ala
                |
       GlcNAc–MurNAc(r)

10 & 11 (isomers)
GlcNAc–MurNAcAnh
|
L-Ala
|
D-Glu
|
L-Orn–Gly–D-Ala
                |
           L-Orn–Gly
                |
              D-Glu
                |
              L-Ala
                |
       GlcNAc–MurNAc(r)

A

B

Systemic administration of PG$^{Bb}$ induces acute arthritis in mice.

A

Control         1 day post PB$^{Bb}$ injection

| Patient code | Treatment stage | PCR test Serum | PCR test Joint fluid | Anti-PGBb IgG level ($A_{450}$) Serum | Anti-PGBb IgG level ($A_{450}$) Joint fluid | PGBb concentration (pg/mL) |
|---|---|---|---|---|---|---|
| 1 | Post-IV | - | - | 0.1360 | 0.3485 | 196.5678 |
| 2 | Post-IV | - | - | 0.2635 | 0.5200 | 290.0891 |
| 3 | Post-oral | - | - | 0.4825 | 0.5215 | 235.4267 |
| 4 | Post-IV | - | - | 0.2530 | 0.4985 | 192.7818 |
| 5 | Post-IV | - | - | 0.1580 | 0.2950 | 147.8163 |
| 6 | Post-IV | - | - | 0.3665 | 0.5050 | 365.4844 |
| 7 | Post-IV | - | - | 0.1635 | 0.4295 | 226.4551 |
| 8 | Post-oral | - | - | 0.2545 | 0.4925 | 234.7741 |
| 9 | Pre-oral | - | + | 0.1565 | 0.2530 | ND** |
| 10 | Pre-oral | - | - | 0.0825 | 0.7150 | 453.4818 |
| 11 | Post-IV | - | - | 0.2620 | 0.4885 | 299.9957 |
| 12 | Post-IV | - | - | 0.4225 | 0.7180 | 544.4852 |
| 13 | Post-oral* | + | + | 0.1810 | 0.6535 | 245.4398 |
| 14 | Post-IV | - | - | 0.1610 | 0.5115 | 208.9477 |
| 15 | Post-IV | - | - | 0.1505 | 0.5390 | 345.3268 |
| 16 | Post-IV | - | - | 0.1610 | 0.5130 | 184.3923 |
| 17 | Pre-oral | + | + | 0.3755 | 0.7400 | 579.9464 |
| 18 | Pre-oral | - | - | 0.2570 | 0.3940 | 64.423 |
| 19 | Post-IV | - | - | 0.1950 | 0.6340 | 227.0843 |
| 20 | Pre-oral | + | + | 0.2805 | 0.6410 | 448.2324 |
| 21 | Post-IV | - | - | 0.0240 | 0.2345 | 22.63914 |
| 22 | Pre-IV | - | - | 0.4135 | 0.6220 | 432.8897 |
| 23 | Post-IV | - | - | 0.1715 | 0.3505 | 232.8273 |
| 24 | Post-IV | - | - | 0.1960 | 0.2425 | 134.2467 |
| 25 | Post-oral | - | - | 0.3925 | 0.5780 | 192.7818 |
| 26 | Post-oral | - | - | 0.1120 | 0.3755 | 27.92979 |
| 27 | Post-oral | - | - | 0.3800 | 0.6440 | 148.652 |
| 28 | Post-oral | - | - | 0.0375 | 0.2370 | ND** |
| 29 | Post-IV | - | - | 0.2895 | 0.4445 | 130.1027 |
| 30 | Post-IV | - | - | 0.4220 | 0.6715 | 277.4131 |
| 31 | Post-oral | - | - | 0.3745 | 0.6945 | 601.4136 |
| 32 | Post-oral | - | - | 0.1720 | 0.2780 | 109.4105 |
| 33 | Pre-oral | + | - | 0.1640 | 0.5170 | 431.638 |
| 34 | Post-oral | - | - | 0.1495 | 0.2770 | 26.4551 |

*Patient received 3 weeks of doxycycline (oral).
** No PGBb could be detected.

BORRELIA BURGDORFERI PEPTIDOGLYCAN AS A DIAGNOSTIC AND TARGET FOR THERAPEUTIC INTERVENTION OF LYME DISEASE-RELATED PATHOLOGIES

CROSS-REFERENCE TO RELATED APPLICATIONS

This application is a continuation under 35 U.S.C. § 111(a) of Patent Cooperation Treaty Application No.: PCT/US2019/064664, filed on Dec. 5, 2019, entitled "*BORRELIA BURGDORFERI* PEPTIDOGLYCAN AS A DIAGNOSTIC AND TARGET FOR THERAPEUTIC INTERVENTION OF LYME DISEASE-RELATED PATHOLOGIES," the contents of which is incorporated by reference herein in its entirety.

Patent Cooperation Treaty Application No.: PCT/US2019/064664 claims the benefit of and priority to U.S. Provisional Patent Application No. 62/775,709, filed on Dec. 5, 2018," the contents of which is incorporated by reference herein in its entirety.

FIELD OF THE DISCLOSURE

The present disclosure provides methods for diagnosing Lyme disease using *Borrelia burgdorferi* peptidoglycan or antibodies that specifically bind to such a peptidoglycan ("anti-peptidoglycan antibody"). Also disclosed herein are anti-peptidoglycan antibodies suitable for the present methods and using such antibodies to treat Lyme disease.

BACKGROUND OF THE DISCLOSURE

The peptidoglycan (PG) cell wall of *Borrelia burgdorferi*, the causative agent of Lyme disease, is unique in chemical composition and structure. *B. burgdorferi* PG contains ornithine (Orn) as the $3^{rd}$ amino acid in the stem peptide; a position usually occupied by diaminopamilate or lysine. Orn is linked to glycine, and an extra hexosamine is occasionally inserted between the common disaccharide repeat of N-acetyl-glucosamine and N-acetyl-muramic acid.

Currently, diagnostics for the detection and treatment of Lyme disease are effective but only after a few weeks of infection. They are limited to antibody-mediated recognition and rely on a few known antigens. Furthermore, some late stage manifestations of Lyme disease lack diagnostics entirely, which has complicated how physicians treat some putative Lyme disease-related symptomology. New strategies to address these deficiencies are warranted.

BRIEF SUMMARY OF THE DISCLOSURE

Provided herein is a method of diagnosing Lyme disease in a subject in need thereof comprising contacting an agent that specifically binds to *Borrelia burgdorferi* peptidoglycan ("anti-peptidoglycan agent") with a biological sample of the subject and measuring the level of *B. burgdorferi* peptidoglycan in the sample. An agent of interest for this purpose may be a protein. A protein agent for this purpose may be an antibody. A protein agent for this purpose may be a protein, which binds preferentially ornithine-containing *B. burgdorferi* peptidoglycan. The agent may comprise a detectable label, e.g. a fluorophore, isotopic label, affinity agent such as biotin, etc.

In some embodiments, the biological sample of the subject has a greater level of *B. burgdorferi* peptidoglycan than a reference (control) sample, e.g., sample of a subject who does not have Lyme disease. In certain embodiments, the level of *B. burgdorferi* peptidoglycan in the biological sample of the subject is greater than at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more in comparison to a corresponding level in the reference sample.

Also provided herein is a method of diagnosing Lyme disease in a subject in need thereof comprising contacting an anti-idiotypic antibody with a biological sample of the subject and measuring the level of the anti-idiotypic antibody in the sample, wherein the anti-idiotypic antibody binds to a region of an antibody that specifically binds to *B burgdorferi* peptidoglycan material.

In some embodiments, the biological sample of the subject has a greater level of the anti-idiotypic antibody compared to a reference sample (e.g., sample of a subject who does not have Lyme disease). In certain embodiments, the level of anti-idiotypic antibody in the biological sample of the subject is greater than at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in the reference sample.

In some embodiments, the contacting and the measuring is performed in vitro. In some embodiments, the biological sample comprises synovial fluid or serum.

In some embodiments, the subject is treated with a therapeutically effective amount of an anti-peptidoglycan antibody after receiving a diagnosis of infection. In certain embodiments, the subject is treated with a therapeutic agent for *Borrelia* after receiving a diagnosis of infection. In some embodiments, the therapeutic agent comprises an antibiotic or a peptidoglycan-specific hydrolase. In certain embodiments, the antibiotic comprises doxycycline, amoxicillin, ceftriaxone, or combinations thereof. In some embodiments, the peptidoglycan-specific hydrolase comprises an amidase or a lysozyme.

The present disclosure also provides a method of treating Lyme disease in a subject in need thereof comprising administering to the subject a therapeutically effective amount of an antibody that specifically binds to a *B. burgdorferi* peptidoglycan ("anti-peptidoglycan antibody").

Also provided herein is a method of reducing, inhibiting, or ameliorating one or more symptoms of Lyme disease in a subject in need thereof comprising administering to the subject a therapeutically effective amount of an antibody that specifically binds to *B. burgdorferi* peptidoglycan ("anti-peptidoglycan antibody").

In some embodiments, administering the anti-peptidoglycan antibody to the subject reduces the level of one or more pro-inflammatory mediators in the subject compared to a reference (e.g., corresponding level in a Lyme disease subject not treated with the anti-peptidoglycan antibody). In certain embodiments, the one or more pro-inflammatory mediators comprise TNF-α, IL-1α, IL-1β, IL-6, IL-8, IFN-γ, IL-17F, or combinations thereof. In some embodiments, the level of one or more pro-inflammatory mediators is reduced by at least about 5%, at least about 10%, at least about 20%, at least about 30%, at least about 40%, at least about 50%, at least about 60%, at least about 70%, at least about 80%, at least about 90% or more compared to the reference.

In some embodiments, the therapeutic methods of the present disclosure further comprise administering an additional therapeutic agent to the subject. In certain embodiments, the additional therapeutic agent comprises an antibiotic or a peptidoglycan-specific hydrolase. In some embodiments, the antibiotic comprises doxycycline, amoxicillin, ceftriaxone, or combinations thereof. In some embodiments, the peptidoglycan-specific hydrolase comprises an amidase or a lysozyme.

In some embodiments, the subject has Lyme arthritis.

In some embodiments, an anti-peptidoglycan antibody binds preferentially to *B. burgdorferi* peptidoglycan over other types of bacterial peptidoglycans. In certain embodiments, the other bacterial peptidoglycan comprises peptidoglycan belonging to *Escherichia coli*, *Bacillus subtilis*, or *Staphylococcus aureus*. In some embodiments, the binding of the anti-peptidoglycan antibody to *B. burgdorferi* peptidoglycan reduces the pro-inflammatory activity of the peptidoglycan.

In some embodiments, the anti-peptidoglycan antibody is a chimeric antibody, a human antibody, or a humanized antibody. In certain embodiments, the anti-peptidoglycan antibody comprises a Fab, a Fab', a F(ab')2, a Fv, a single chain Fv (scFv), or combinations thereof. In further embodiments, the anti-peptidoglycan antibody is selected from the group consisting of an IgG1, an IgG2, an IgG3, an IgG4, a variant thereof, and any combination thereof.

In some embodiments, the anti-peptidoglycan antibody is linked to an agent, thereby forming an immunoconjugate. In some embodiments, the anti-peptidoglycan antibody is formulated with a pharmaceutically acceptable carrier.

In some embodiments, the anti-peptidoglycan antibody is administered intravenously, orally, parenterally, intrathecally, intra-cerebroventricularly, pulmonarily, intramuscularly, subcutaneously, intravitreally, or intraventricularly.

In some embodiments, the subject is a human.

Provided herein is method of treating Lyme disease in a subject in need thereof comprising administering to the subject a therapeutically effective amount of a peptidoglycan-specific hydrolase.

Also provided herein is a method of reducing, inhibiting, or ameliorating one or more symptoms of Lyme disease in a subject in need thereof comprising administering to the subject a therapeutically effective amount of a peptidoglycan-specific hydrolase.

In some embodiments, a method of diagnosing *Borrelia burgdorferi* infection in an individual is provided, the method comprising: a) collecting at least one biological sample from the individual; b) contacting said at least sample from the individual with an agent specific for *B. burgdorferi* peptidoglycan, which agents are operably linked to a detectable moiety in a reaction mixture; c) washing the reaction mixture free of unbound agent; d) analyzing the reaction mixture for the presence of bound peptidoglycan-specific agent to determine the presence of *B. burgdorferi* peptidoglycan, wherein the presence is indicative of a *B. burgdorferi* infection; and e) diagnosing the individual with *B. burgdorferi* infection if the presence of one peptidoglycan at a level greater than that of a reference sample is detected. An advantage of the method is the ability to detect infection within a relatively short period of time. Infection may be detected within about 1 week, within about 2 weeks, within about 3 weeks after the initial infection.

In some embodiments, the method further comprises treating the individual for *B. burgdorferi* infection and/or Lyme disease if the presence of *B. burgdorferi* peptidoglycan is detected. In some embodiments, the treatment comprises administering an antibiotic. In some methods the treatment comprises administering to the subject a therapeutically effective amount of a peptidoglycan-specific hydrolase.

DETAILED DESCRIPTION OF THE DISCLOSURE

Figure 1:
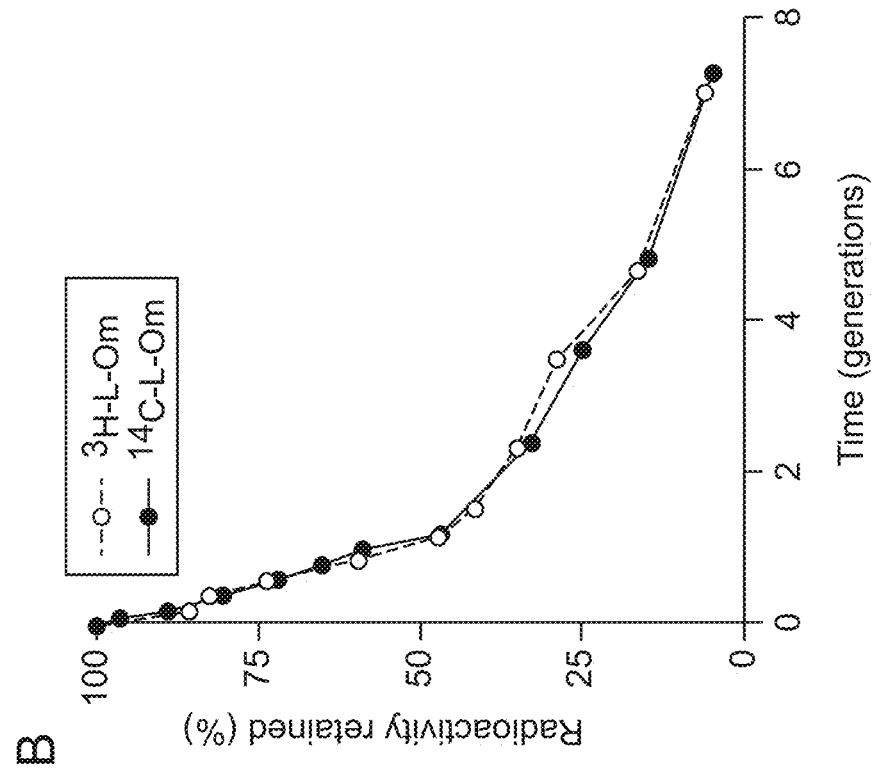
FIG. 1. *B. burgdorferi* sheds muropeptides into its extracellular environment. (A, Top) Chromatogram of cellosyl-digested and reduced *B. burgdorferi* peptidoglycan isolated from *B. burgdorferi* B31. Numbers correspond to the identified chemical species shown below. The asterisk indicates an unidentified species. Analysis performed on three separate preparations produced highly similar chromatograms. (A, Bottom) Chemical composition of muropeptides in peaks shown in the chromatogram. Muropeptide identification was accomplished by MS. MurNAc(r) and Anh indicate N-acetylmuramitol and 1,6-anhydro group, respectively. (B) Plot showing peptidoglycan turnover over multiple generations in *B. burgdorferi* grown in vitro. *B. burgdorferi* peptidoglycan was pulse-radiolabeled by incubating cells in medium containing 7.5 µCi/mL of 3H- or 14C-L-Orn for 48 h. Cells were then washed to remove unincorporated isotope, and outgrowth was tracked in complete BSK II medium lacking radioactive L-Orn. At each time point, the same volume of batch culture was removed, bacterial density was determined, and *B. burgdorferi* peptidoglycan was purified for quantification of its radioactivity per volume equivalent. The retained radioactivity was then plotted as a percentage of total radioactivity in the PG at time 0 (i.e., start of outgrowth). (C) Muropeptide accumulation in the culture medium. Cultures of *B. burgdorferi* ($5\times10^7$ cells per milliliter) were diluted to a starting density of $10^4$ cells per milliliter and monitored for muropeptide release during growth in complete BSK II medium (lacking phenol red) using an hNOD2 reporter cell line in the presence or absence of the RIP2 inhibitor gefitinib. NF-κB activity (absorbance at 650 nm) provides a measure of NOD2-specific muropeptide levels present in the culture medium samples collected at the indicated time points. Shown are the mean and standard deviation (SD) of NF-κB activation for two biological replicates at each time point.

The present disclosure provides methods for treating, controlling, or ameliorating Lyme disease-related pathologies, e.g., Lyme arthritis, in a subject in need thereof comprising administering an agent specific for B. burgdorferi peptidoglycan. The present disclosure also provides that a subject having Lyme disease-related pathologies can be identified by measuring the level of B. burgdorferi peptidoglycan in a sample of the subject (e.g., synovial fluid). The level of B. burgdorferi peptidoglycan can be measured directly; by measuring the level of antibodies against B. burgdorferi peptidoglycan.

Early detection, and the ability to determine the presence of actively growing Borrelia in contrast to a prior infection, can be benefits of the present methods. Current tests are not sensitive or specific enough for early diagnosis. Diagnosis of early Lyme disease (LD) relies on the presence of a skin lesion called erythema migrans (EM). However, 30-40% patients do not develop an EM. Even when an EM develops, this rash can be confused with nummular eczema, insect bite, ringworm, or granuloma annulare. Current serologic tests are often (60-70%) negative during early infection (Aguero-Rosenfeld et al. (2005). Clin Microbiol Rev 18:484-509), even in patients with multiple EMs. This is because it takes time for the titer of the tested antibodies to be high enough to become detectable by current serologic assays.

Indirect detection of B. burgdorferi infection can be later achieved by detection of antibodies to B. burgdorferi in patient sera using a 2-tiered procedure, consisting of an ELISA and a Western blot (Centers for Disease Control and Prevention. Recommendations for test performance and interpretation from the second national conference on serologic diagnosis of Lyme disease. MMWR 1995; 44: 590-1). Newer test uses a single ELISA to detect antibodies against a peptide of a surface protein (such as the C6 epitope of the VlsE protein) to reduce the problem of cross-reactivity (false-positive) reported for the older 2-tiered test. However, surface proteins often display polymorphism due to genome sequence heterogeneity among strains and genospecies of B. burgdorferi (Kingry L C et al. PLoS One, 11:e0168994 (2016); Wilske et al. Med Microbiol Immunol.; 184(4):195-201 (1996); Wilske et al. J Clin Microbiol. 1993, 31:340-50; Liang et al. J Immunol 163:5566-73 (1999)). For example, the C6 epitope is only partially conserved across strains of B. burgdorferi due to sequence variation (Gomes-Solecki et al. Clin Vaccine Immunol 14:875-9 (2007); Krupka et al. Clin Vaccine Immunol 16:1546-62 (2009)). Furthermore, even in disseminated infection, false-negative results have been reported, even after the gold standard of one month of illness (Benach et al. N Engl J Med 308:740-2 (1983)).

In addition, false positive results occur because the specificity of current tests is not perfect. Another reason for false-positive results can be because a previous infection, as seropositivity can last for years (Nadelman et al. N Engl J Med 2012; 367:1883-90; Hilton et al. Am J Med, 106:404-9 (1999)).

A diagnostic based on peptidoglycan can address these limitations. Peptidoglycan can generate an earlier immune response than proteins currently used in serological assay because it is a well-known immunomodulator of innate immunity (Mukherjee et al. Arch. Biochem. Biophys, 670, 69-81 (2019)).) and therefore could be detected by the host immune system very early.

In addition, because it is shown herein that B. burgdorferi sheds peptidoglycan fragments during growth, detection of such fragments wherever B. burgdorferi grows would provide a direct method of detection for active infection, in contrast to current serologic tests. It is shown herein, for example in FIG. 12, that such detection can be highly specific due to the unusual chemistry of B. burgdorferi peptidoglycan. It is also shown herein that antibodies discriminate between B. burgdorferi peptidoglycan and other bacterial peptidoglycans. Further, the chemical composition of the basic PG subunit appears conserved in Borrelia sp. (Johnson et al. Yale J Biol Med. 57:529-37 (1984)), suggesting that a diagnostic against peptidoglycan would be more broadly applicable against the different strains/genospecies that cause Lyme disease.

To facilitate an understanding of the disclosure disclosed herein, a number of terms and phrases are defined. Additional definitions are set forth throughout the detailed description.

I. Definitions

Throughout this disclosure, the term "a" or "an" entity refers to one or more of that entity; for example, "an antibody," is understood to represent one or more antibodies. As such, the terms "a" (or "an"), "one or more," and "at least one" can be used interchangeably herein.

Furthermore, "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

Unless defined otherwise, all technical and scientific terms used herein have the same meaning as commonly understood by one of ordinary skill in the art to which this disclosure is related. For example, the Concise Dictionary of Biomedicine and Molecular Biology, Juo, Pei-Show, 2nd ed., 2002, CRC Press; The Dictionary of Cell and Molecular Biology, 3rd ed., 1999, Academic Press; and the Oxford Dictionary of Biochemistry and Molecular Biology, Revised, 2000, Oxford University Press, provide one of skill with a general dictionary of many of the terms used in this disclosure.

Units, prefixes, and symbols are denoted in their Systeme International de Unites (SI) accepted form. Numeric ranges are inclusive of the numbers defining the range. Unless otherwise indicated, amino acid sequences are written left to right in amino to carboxy orientation. The headings provided herein are not limitations of the various aspects of the disclosure, which can be had by reference to the specification as a whole. Accordingly, the terms defined immediately below are more fully defined by reference to the specification in its entirety.

The term "about" is used herein to mean approximately, roughly, around, or in the regions of. When the term "about" is used in conjunction with a numerical range, it modifies that range by extending the boundaries above and below the numerical values set forth. In general, the term "about" can modify a numerical value above and below the stated value by a variance of, e.g., 10 percent, up or down (higher or lower).

In some embodiments, the therapeutic compositions (e.g., antibodies against *B. burgdorferi* peptidoglycan) and methods disclosed herein can be used to protect against other species of *Borrelia* including, but not limited to, *Borrelia japonica, Borrelia andersonii, Borrelia bissettii, Borrelia sinica, Borrelia turdi, Borrelia tanukii, Borrelia valaisiana, Borrelia lusitaniae, Borrelia spielmanii, Borrelia miyamotoi*, or *Borrelia lonestar*. Accordingly, antibodies described herein can cross-react with multiple species of *Borrelia*, including variants thereof.

*B. burgdorferi* has similar structural features to other Borreliae in that it has a flexible cell wall composed of outer and inner/cytoplasmic membranes surrounding periplasmic flagella (Rosa, P. A., et al., *Nat Rev Microbiol* 3(2):129-43 (2005)). The inner and outer membranes enclosed a thin layer of peptidoglycan. The outer membrane of *B. burgdorferi* is easily disrupted and does not contain lipopolysaccharide (LPS). A number of antigenic *B. burgdorferi* cell surface proteins have been identified. These include the outer membrane surface proteins (Osp) OspA, OspB, OspC and VIsE. OspA and OspB are encoded by tightly linked tandem genes which are transcribed as a single transcriptional unit (Brusca, J. et al., *J. Bacteriol.* 173:8004-8008 (1991)). The most-studied *B. burgdorferi* membrane protein is OspA, a lipoprotein antigen expressed by Borreliae in testing ticks and the most abundant protein expressed in vitro by most borrelial isolates (Barbour, A. G., et al., *Infection & Immunity* 41:795-804 (1983); Howe, T. R., et al., *Science* 227:645 (1985)).

The term "Lyme disease" (also known as Lyme borreliosis) refers to a zoonotic, vector-borne disease caused by extracellular spirochetal bacteria from the genus *Borrelia*.

Lyme disease is most often transmitted by the bite from an infected tick (e.g. the lxodes tick). The infected nymphal tick transmits *B. burgdorferi* via its saliva to the human during its blood meal. Clinical presentation of Lyme disease is best known for the characteristic bull's-eye rash (also known as erythema chronicum migrans) but can also include myocarditis, cardiomyopathy, arrhythmia, arthritis, arthralgia, acrodermatitis, meningitis, neuropathies, and facial nerve palsy depending on the stage of infection.

Lyme disease generally consists of three separate stages. Stage 1 is known as the Early Localized stage and occurs approximately 3 days-1 month after inoculation. Stage 1 is most commonly characterized by erythema migrans (a red "bull's-eye" rash seen as an erythematous circle encircling a defined center that expands outward). This skin lesion is often followed by flu-like symptoms, such as myalgia, arthralgia, headache and fever. If left untreated, the disease progresses to Stage 2 or the Early Disseminated stage, which generally occurs weeks-months after an infection. During Stage 2 the bacteria move into the blood stream from the site of infection and to more distant tissues and organs. Neurological, cardiovascular and arthritic symptoms that occur in this stage include meningitis, cranial neuropathy and intermittent inflammatory arthritis. Stage 3 is known as the Late Disseminated stage and occurs months-years after an initial infection. Symptoms can become chronic and can include encephalitis, meningitis, and arthritis (particularly of the knee).

The best parameter for diagnosis of early Lyme borreliosis is the characteristic expanding red skin lesion or erythema migrans (EM). Unfortunately, ~30 percent of patients do not develop this rash, and the usual symptoms of early disease, such as fatigue, fever, or headache, are too non-specific to be diagnostic. Lyme borreliosis in a symptomatic patient can be diagnosed using a variety of serological tests, and the most common diagnostic test is indirect ELISA testing for Lyme-specific antibodies in serum.

Antimicrobial agents are the principle method of treatment of Lyme borreliosis infection. The antibiotic used depends on the stage of the disease, symptoms, and the patient's allergies to medication. The length of the antibiotics course also depends on the stage of the disease and severity of symptoms. Early Lyme borreliosis is typically treated with oral tetracyclines, such as doxycycline, and semi-synthetic penicillins, such as amoxicillin or penicillin V. Arthritic and neurological disorders are treated with high-dose intravenous penicillin G or ceftriaxone.

The term "peptidoglycan" (also known as murein), a major component of the bacterial cell wall, refers to a polymer consisting of sugars and amino acids that forms a mesh-like layer that surrounds the cytoplasmic membrane of almost all bacteria (including *B. burgdorferi*). The sugar component consists of alternating residues of β-(1,4) linked N-acetylglucosamine (NAG) and N-acetylmuramic acid (NAM). Attached to the N-acetylmuramic acid is a peptide chain of three to five amino acids. The peptide chain can be cross-linked to the peptide chain of another strand forming the 3D mesh-like layer. Peptidoglycan serves a structural role in the bacterial cell wall, giving structural strength, as well as counteracting the osmotic pressure of the cytoplasm. Peptidoglycan is also involved in binary fission during bacterial cell reproduction. In Gram-negative bacteria and Borreliae, the peptidoglycan is not surface-exposed, as it is encased by the outer membrane. (Rosa, P. A., et al., *Nat Rev Microbiol* 2005, 3(2):129-43 (2005); Höltje, J. V., *Microbiol Mol Biol Rev* 62(1):181-203 (1998)). To accommodate cell growth and incorporation of new peptidoglycan material, about 40% of the existing peptidoglycan is degraded at every generation (Park J T, Uehara T *Microbiol Mol Biol Rev* 72(2):211-227 (2008)).

Compared to most other bacteria, the peptidoglycan of *B. burgdorferi* has an unusual chemical composition. The peptidoglycan of most Gram-negative and Gram-positive bacteria have m-diaminopimelate and L-lysine, respectively, at the third amino acid position. In contrast, the peptidoglycan of *B. burgdorferi* has L-ornithine at the third amino acid position. This ornithine is linked to a glycine.

The terms "antibody" and "antibodies" are terms of art and can be used interchangeably herein and refer to a molecule with an antigen binding site that specifically binds an antigen. The terms as used to herein include whole (full-length) antibodies and any antigen binding fragments (i.e., "antigen-binding portions") or single chains thereof. An "antibody" refers, in one embodiment, to a glycoprotein comprising at least two heavy (H) chains and two light (L) chains inter-connected by disulfide bonds, or an antigen binding portion thereof. In another embodiment, an"antibody" refers to a single chain antibody comprising a single variable domain, e.g., VHH domain. Each heavy chain is comprised of a heavy chain variable region (abbreviated herein as VH) and a heavy chain constant region. In certain naturally occurring antibodies, the heavy chain constant region is comprised of three domains, CH1, CH2 and CH3. In certain naturally occurring antibodies, each light chain is comprised of a light chain variable region (abbreviated herein as VL) and a light chain constant region. The light chain constant region is comprised of one domain, CL.

The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

Antibodies can be of any type (e.g., IgG, IgE, IgM, IgD, IgA or IgY), any class (e.g., IgD, IgG2, IgG3, IgG4, IgA1 or IgA2), or any subclass (e.g., IgG1, IgG2, IgG3 and IgG4 in humans, and IgG1, IgG2a, IgG2b and IgG3 in mice) of immunoglobulin molecule. Immunoglobulins, e.g., IgG1, exist in several allotypes, which differ from each other in at most a few amino acids. An antibody disclosed herein can be from any of the commonly known isotypes, classes, subclasses, or allotypes. In certain embodiments, the antibodies described herein are of the IgG1, IgG2, IgG3 or IgG4 subclass or any hybrid thereof. In certain embodiments, the antibodies are of the IgG2, IgG4 or IgG2/IgG4 subclass.

"Antibody" includes, by way of example, both naturally occurring and non-naturally occurring antibodies; monoclonal and polyclonal antibodies; chimeric and humanized antibodies; human and nonhuman antibodies; wholly synthetic antibodies; single chain antibodies; monospecific antibodies; multispecific antibodies (including bispecific antibodies); tetrameric antibodies comprising two heavy chain and two light chain molecules; an antibody light chain monomer; an antibody heavy chain monomer; an antibody light chain dimer, an antibody heavy chain dimer; an antibody light chain-antibody heavy chain pair; intrabodies; heteroconjugate antibodies; monovalent antibodies; single chain antibodies; camelized antibodies; affibodies; anti-idiotypic (anti-Id) antibodies (including, e.g., anti-anti-Id antibodies), and single-domain antibodies (sdAbs), which include binding molecules consisting of a single monomeric variable antibody domain that are fully capable of antigen binding (e.g., a VH domain or a VL domain). Harmen M. M. and Haard H. J. *Appl Microbiol Biotechnol.* 77(1): 13-22 (2007)).

The term "antigen-binding portion" of an antibody, as used herein, refers to one or more fragments of an antibody that retain the ability to specifically bind to an antigen (e.g., *B. burgdorferi* peptidoglycan). Such "fragments" are, for example between about 8 and about 1500 amino acids in length, suitably between about 8 and about 745 amino acids in length, suitably about 8 to about 300, for example about 8 to about 200 amino acids, or about 10 to about 50 or 100 amino acids in length. It has been shown that the antigen-binding function of an antibody can be performed by fragments of a full-length antibody. Examples of binding fragments encompassed within the term "antigen-binding portion" of an antibody, e.g., an anti-peptidoglycan antibody described herein, include (i) a Fab fragment, a monovalent fragment consisting of the VL, VH, CL, and CH1 domains; (ii) a F(ab')2 fragment, a bivalent fragment comprising two Fab fragments linked by a disulfide bridge at the hinge region; (iii) a Fd fragment consisting of the VH and CH1 domains; (iv) a Fv fragment consisting of the VL and VH domains of a single arm of an antibody, and disulfide-linked Fvs (sdFv) (v) a dAb fragment (Ward et al., (1989) Nature 341:544-546), which consists of a VH domain; and (vi) an isolated complementarity determining region (CDR) or (vii) a combination of two or more isolated CDRs which can optionally be joined by a synthetic linker. Furthermore, although the two domains of the Fv fragment, VL and VH, are coded for by separate genes, they can be joined, using recombinant methods, by a synthetic linker that enables them to be made as a single protein chain in which the VL and VH regions pair to form monovalent molecules (known as single chain Fv (scFv); see, e.g., Bird et al., (1988) *Science* 242:423-426; and Huston et al., (1988) *Proc. Natl. Acad. Sci. USA* 85:5879-5883). Such single chain antibodies are also intended to be encompassed within the term "antigen-binding portion" of an antibody. These antibody fragments are obtained using conventional techniques known to those with skill in the art, and the fragments are screened for utility in the same manner as are intact antibodies. Antigen-binding portions can be produced by recombinant DNA techniques, or by enzymatic or chemical cleavage of intact immunoglobulins.

As used herein, the terms "variable region" or "variable domain" are used interchangeably and are common in the art. The variable region typically refers to a portion of an antibody, generally, a portion of a light or heavy chain, typically about the amino-terminal 110 to 120 amino acids in the mature heavy chain and about 90 to 115 amino acids in the mature light chain, which differ extensively in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR).

Without wishing to be bound by any particular mechanism or theory, it is believed that the CDRs of the light and heavy chains are primarily responsible for the interaction and specificity of the antibody with antigen. In certain embodiments, the variable region is a human variable region. In certain embodiments, the variable region comprises rodent or murine CDRs and human framework regions (FRs). In particular embodiments, the variable region is a primate (e.g., non-human primate) variable region. In certain embodiments, the variable region comprises rodent or murine CDRs and primate (e.g., non-human primate) framework regions (FRs).

As used herein, the term "heavy chain" when used in reference to an antibody can refer to any distinct type, e.g., alpha ($\alpha$), delta ($\delta$), epsilon ($\epsilon$), gamma ($\gamma$) and mu ($\mu$), based on the amino acid sequence of the constant domain, which give rise to IgA, IgD, IgE, IgG and IgM classes of antibodies, respectively, including subclasses of IgG, e.g., IgG1, IgG2, IgG3 and IgG4.

As used herein, the term "light chain" when used in reference to an antibody can refer to any distinct type, e.g., kappa ($\kappa$) or lambda ($\lambda$) based on the amino acid sequence of the constant domains. Light chain amino acid sequences are well known in the art. In specific embodiments, the light chain is a human light chain.

The terms "VL" and "VL domain" are used interchangeably to refer to the light chain variable region of an antibody.

The terms "VH" and "VH domain" are used interchangeably to refer to the heavy chain variable region of an antibody.

As used herein, the term "constant region" or "constant domain" are interchangeable and have its meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain.

An "Fc region" (fragment crystallizable region) or "Fc domain" or "Fc" refers to the C-terminal region of the heavy chain of an antibody that mediates the binding of the immunoglobulin to host tissues or factors, including binding to Fc receptors located on various cells of the immune system (e.g., effector cells) or to the first component (C1q) of the classical complement system. Thus, an Fc region comprises the constant region of an antibody excluding the first constant region immunoglobulin domain (e.g., CH1 or CL). In IgG, IgA and IgD antibody isotypes, the Fc region comprises two identical protein fragments, derived from the second (CH2) and third (CH3) constant domains of the antibody's two heavy chains; IgM and IgE Fc regions comprise three heavy chain constant domains (CH domains 2-4) in each polypeptide chain. For IgG, the Fc region comprises immunoglobulin domains C$\gamma$2 and C$\gamma$3 and the hinge between C$\gamma$1 and C$\gamma$2. Although the boundaries of the Fc region of an immunoglobulin heavy chain might vary, the human IgG heavy chain Fc region is usually defined to stretch from an amino acid residue at position C226 or P230 (or amino acid between these two amino acids) to the carboxy-terminus of the heavy chain, wherein the numbering is according to the EU index as in Kabat. The CH2 domain of a human IgG Fc region extends from about amino acid 231 to about amino acid 340, whereas the CH3 domain is positioned on C-terminal side of a Cm domain in an Fc region, i.e., it extends from about amino acid 341 to about amino acid 447 of an IgG. As used herein, the Fc region can be a native sequence Fc, including any allotypic variant, or a variant Fc (e.g., a non-naturally occurring Fc). Fc can also refer to this region in isolation or in the context of an Fc-comprising protein polypeptide such as a "binding protein comprising an Fc region," also referred to as an "Fc fusion protein" (e.g., an antibody or immunoadhesin).

A "native sequence Fc region" or "native sequence Fc" comprises an amino acid sequence that is identical to the amino acid sequence of an Fc region found in nature. Native sequence human Fc regions include a native sequence human IgG1 Fc region; native sequence human IgG2 Fc region; native sequence human IgG3 Fc region; and native sequence human IgG4 Fc region as well as naturally occurring variants thereof. Native sequence Fc includes the various allotypes of Fcs (see, e.g., Jefferis et al., (2009) mAbs 1:1; Vidarsson G. et al., *Front Immunol.* 5:520 (published online Oct. 20, 2014)).

An "Fc receptor" or "FcR" is a receptor that binds to the Fc region of an immunoglobulin. FcRs that bind to an IgG antibody comprise receptors of the Fc$\gamma$R family, including allelic variants and alternatively spliced forms of these receptors. The Fc$\gamma$R family consists of three activating (Fc$\gamma$RI, Fc$\gamma$RIII, and Fc$\gamma$RIV in mice; Fc$\gamma$RIA, Fc$\gamma$RIIA, and Fc$\gamma$RIIIA in humans) and one inhibitory (Fc$\gamma$RIIB) receptor. Human IgG1 binds to most human Fc receptors and elicits the strongest Fc effector functions. It is considered equivalent to murine IgG2a with respect to the types of activating Fc receptors that it binds to. Conversely, human IgG4 elicits the least Fc effector functions. Vidarsson G. et al., *Front Immunol.* 5:520 (published online Oct. 20, 2014).

The constant region can be manipulated, e.g., by recombinant technology, to eliminate one or more effector functions. An "effector function" refers to the interaction of an antibody Fc region with an Fc receptor or ligand, or a biochemical event that results therefrom. Exemplary "effector functions" include C1q binding, complement dependent cytotoxicity (CDC), Fc receptor binding, Fc$\gamma$R-mediated effector functions such as ADCC and antibody dependent cell-mediated phagocytosis (ADCP), and down regulation of a cell surface receptor (e.g., the B cell receptor; BCR). Such effector functions generally require the Fc region to be combined with a binding domain (e.g., an antibody variable domain). Accordingly, the term "a constant region without the Fc function" include constant regions with reduced or without one or more effector functions mediated by Fc region.

Effector functions of an antibody can be reduced or avoided by different approaches. Effector functions of an antibody can be reduced or avoided by using antibody fragments lacking the Fc region (e.g., such as a Fab, F(ab')$_2$, single chain Fv (scFv), or a sdAb consisting of a monomeric VH or VL domain). Alternatively, the so-called aglycosylated antibodies can be generated by removing sugars that are linked to particular residues in the Fc region to reduce the effector functions of an antibody while retaining other valuable attributes of the Fc region (e.g., prolonged half-life and heterodimerization). Aglycosylated antibodies can be generated by, for example, deleting or altering the residue the sugar is attached to, removing the sugars enzymatically, producing the antibody in cells cultured in the presence of a glycosylation inhibitor, or by expressing the antibody in cells unable to glycosylate proteins (e.g., bacterial host cells). See, e.g., U.S. Pub. No. 20120100140. Another approach is to employ Fc regions from an IgG subclass that have reduced effector function, for example, IgG2 and IgG4 antibodies are characterized by having lower levels of Fc effector functions than IgG1 and IgG3. The residues most proximal to the hinge region in the CH2 domain of the Fc part are responsible for effector functions of antibodies as it contains a largely overlapping binding site for C1q (complement) and IgG-Fc receptors (FcγR) on effector cells of the innate immune system. Vidarsson G. et al., *Front Immunol.* 5:520 (published online Oct. 20, 2014). Accordingly, antibodies with reduced or without Fc effector functions can be prepared by generating, e.g., a chimeric Fc region which comprises a CH2 domain from an IgG antibody of the IgG4 isotype and a CH3 domain from an IgG antibody of the IgG1 isotype, or a chimeric Fc region which comprises hinge region from IgG2 and CH2 region from IgG4 (see, e.g., Lau C. et al., *J. Immunol.* 191:4769-4777 (2013)), or an Fc region with mutations that result in altered Fc effector functions, e.g., reduced or no Fc functions. Such Fc regions with mutations are known in the art. See, e.g., U.S. Pub. No. 20120100140 and U.S. and PCT applications cited therein and An et al., *mAbs* 1:6, 572-579 (2009); the disclosure of which are incorporated by reference to their entirety.

A "hinge", "hinge domain" or "hinge region" or "antibody hinge region" refers to the domain of a heavy chain constant region that joins the CH1 domain to the CH2 domain and includes the upper, middle, and lower portions of the hinge (Roux et al., *J. Immunol.* 1998 161:4083). The hinge provides varying levels of flexibility between the binding and effector regions of an antibody and also provides sites for intermolecular disulfide bonding between the two heavy chain constant regions. As used herein, a hinge starts at Glu216 and ends at Gly237 for all IgG isotypes (Roux et al., 1998 J Immunol 161:4083). The sequences of wild-type IgG1, IgG2, IgG3 and IgG4 hinges known in the art. See, e.g., Kabat E A et al., (1991) Sequences of Proteins of Immunological Interest, Fifth Edition, U.S. Department of Health and Human Services, NIH Publication No. 91-3242; Vidarsson G. et al., *Front Immunol.* 5:520 (published online Oct. 20, 2014).

The term "CH1 domain" refers to the heavy chain constant region linking the variable domain to the hinge in a heavy chain constant domain. As used herein, a CH1 domain starts at A118 and ends at V215. The term "CH1 domain" includes wildtype CH1 domains, as well as naturally existing variants thereof (e.g., allotypes). CH1 domain sequences of IgG1, IgG2, IgG3, and IgG4 (including wildtype and allotypes) are known in the art. See, e.g., Kabat E A et al., (1991) supra and Vidarsson G. et al., *Front Immunol.* 5:520 (published online Oct. 20, 2014). Exemplary CH1 domains include CH1 domains with mutations that modify a biological activity of an antibody, e.g., half-life, e.g., described in U.S. Pub. No. 20120100140 and U.S. patents and publications and PCT publications cited therein.

The term "CH2 domain" refers to the heavy chain constant region linking the hinge to the CH3 domain in a heavy chain constant domain. As used herein, a CH2 domain starts at P238 and ends at K340. The term "CH2 domain" includes wildtype CH2 domains, as well as naturally existing variants thereof (e.g., allotypes). CH2 domain sequences of IgG1, IgG2, IgG3, and IgG4 (including wildtype and allotypes) are known in the art. See, e.g., Kabat E A et al., (1991) supra and Vidarsson G. et al., *Front Immunol.* 5:520 (published online Oct. 20, 2014). Exemplary CH2 domains include CH2 domains with mutations that modify a biological activity of an antibody, e.g., half-life and/or reduced Fc effector function, e.g., described in U.S. Pub. No. 20120100140 and U.S. patents and publications and PCT publications cited therein.

The term "CH3 domain" refers to the heavy chain constant region that is C-terminal to the CH2 domain in a heavy chain constant domain. As used herein, a CH3 domain starts at G341 and ends at K447. The term "CH3 domain" includes wildtype CH3 domains, as well as naturally existing variants thereof (e.g., allotypes). CH3 domain sequences of IgG1, IgG2, IgG3, and IgG4 (including wildtype and allotypes) are known in the art. See, e.g., Kabat E A et al., (1991) supra and Vidarsson G. et al., *Front Immunol.* 5:520 (published online Oct. 20, 2014). Exemplary CH3 domains include CH3 domains with mutations that modify a biological activity of an antibody, e.g., half-life, e.g., described in U.S. Pub. No. 20120100140 and U.S. patents and publications and PCT publications cited therein.

As used herein, "isotype" refers to the antibody class (e.g., IgG1, IgG2, IgG3, IgG4, IgM, IgA1 IgA2, IgD, and IgE antibody) that is encoded by the heavy chain constant region genes.

"Allotype" refers to naturally occurring variants within a specific isotype group, which variants differ in a few amino acids (see, e.g., Jefferis et al., (2009) *mAbs* 1:1). Antibodies described herein can be of any allotype. Allotypes of IgG1, IgG2, IgG3, and IgG4 are known in the art. See, e.g., Kabat E A et al., (1991) supra; Vidarsson G. et al., *Front Immunol.* 5:520 (published online Oct. 20, 2014); and Lefranc M P, *mAbs* 1:4, 1-7(2009).

The phrases "an antibody recognizing an antigen" and "an antibody specific for an antigen" are used interchangeably herein with the term "an antibody which binds specifically to an antigen."

As used herein, "anti-idiotypic" or "anti-idiotypic antibody" refers to an antibody raised against a first/primary antibody which specifically binds to an idiotope of the first antibody. As used herein, the term "idiotope" or "idiotypic determinant" refers to an antigenic determinant or epitope expressed on a first/primary antibody. In some embodiments, the idiotope is unique to the immunoglobulin product of a single clone of cells. In some embodiments, the idiotope is found in the variable region of the primary antibody. In some embodiments, the idiotope is a framework-associated or regulatory idiotope in the primary antibody.

An "isolated antibody," as used herein, is intended to refer to an antibody which is substantially free of other antibodies having different antigenic specificities (e.g., an isolated antibody that specifically binds to *B. burgdorferi* peptidoglycan is substantially free of antibodies that specifically bind antigens other than *B. burgdorferi* peptidoglycan).

"Binding affinity" generally refers to the strength of the sum total of non-covalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant ($K_D$). Affinity can be measured and/or expressed in a number of ways known in the art, including, but not limited to, equilibrium dissociation constant ($K_D$), and equilibrium association constant ($K_A$). The $K_D$ is calculated from the quotient of $k_{off}/k_{on}$ and is expressed as a molar concentration (M), whereas $K_A$ is calculated from the quotient of $k_{on}/k_{off}$. $k_{on}$ refers to the association rate constant of, e.g., an antibody to an antigen, and $k_{off}$ refers to the dissociation of, e.g., an antibody to an antigen. The $k_{on}$ and $k_{off}$ can be determined by techniques known to one of ordinary skill in the art, such as immunoassays (e.g., enzyme-linked immunosorbent assay (ELISA)), BIACORE® or kinetic exclusion assay (KinExA).

As used herein, the terms "specifically binds," "specifically recognizes," "specific binding," "selective binding," and "selectively binds," are analogous terms in the context of antibodies and refer to molecules (e.g., antibodies) that bind to an antigen (e.g., epitope or immune complex) as such binding is understood by one skilled in the art. For example, a molecule that specifically binds to an antigen can bind to other peptides or polypeptides, generally with lower affinity as determined by, e.g., immunoassays, BIACORE®, KinExA 3000 instrument (Sapidyne Instruments, Boise, ID), or other assays known in the art. In a specific embodiment, molecules that specifically bind to an antigen bind to the antigen with a $K_A$ that is at least 2 logs, 2.5 logs, 3 logs, 4 logs or greater than the $K_A$ when the molecules bind to another antigen.

As used herein, the term "binds to a *B. burgdorferi* peptidoglycan" refers to the binding of, e.g., an anti-peptidoglycan antibody disclosed herein, to one or more moieties or epitopes on a *Borrelia burgdorferi* peptidoglycan. The *B. burgdorferi* peptidoglycan can be a whole peptidoglycan or a fragment/remnant thereof.

Antibodies typically bind specifically to their cognate antigen with high affinity, reflected by a dissociation constant ($K_D$) of $10^{-5}$ to $10^{-11}$ M or less. Any $K_D$ greater than about $10^{-4}$ M is generally considered to indicate nonspecific binding. As used herein, an antibody that "binds specifically" to an antigen refers to an antibody that binds to the antigen and substantially identical antigens with high affinity, which means having a $K_D$ of $10^{-7}$ M or less, preferably $10^{-8}$ M or less, even more preferably $10^{-9}$ M or less, and most preferably between $10^{-8}$ M and $10^{-10}$ M or less, when determined by, e.g., immunoassays (e.g., ELISA) or surface plasmon resonance (SPR) technology in a BIACORE 2000 instrument using the predetermined antigen, but does not bind with high affinity to unrelated antigens.

Unless specified otherwise, the term "anti-peptidoglycan antibody" used herein refers to an antibody that specifically binds to peptidoglycan of *B. burgdorferi*.

As used herein, the term "antigen" refers to any natural or synthetic immunogenic substance, such as a protein, peptide, or hapten. In some embodiments, an antigen comprises *B. burgdorferi* peptidoglycan. In other embodiments, an antigen comprises an antibody (e.g., variable region) directed against *B. burgdorferi* peptidoglycan (e.g., anti-idiotypic antibody).

As used herein, an "epitope" is a term in the art and refers to a localized region of an antigen to which an antibody can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). Epitopes formed from contiguous amino acids are typically, but not always, retained on exposure to denaturing solvents, whereas epitopes formed by tertiary folding are typically lost on treatment with denaturing solvents. An epitope typically includes at least 3, 4, 5, 6, 7, 8, 9, 10, 11, 12, 13, 14, 15, or 20 amino acids in a unique spatial conformation. Methods for determining what epitopes are bound by a given antibody (i.e., epitope mapping) are well known in the art. Methods of determining spatial conformation of epitopes include techniques in the art and those described herein, for example, x-ray crystallography, 2-dimensional nuclear magnetic resonance and HDX-MS (see, e.g., Epitope Mapping Protocols in Methods in Molecular Biology, Vol. 66, G. E. Morris, Ed. (1996)).

In certain embodiments, the epitope to which an antibody binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization can be accomplished using any of the known methods in the art (e.g., Giege R et al., (1994) *Acta Crystallogr D Biol Crystallogr* 50(Pt 4): 339-350; McPherson A (1990) *Eur J Biochem* 189: 1-23; Chayen N E (1997) *Structure* 5: 1269-1274; McPherson A (1976) *J Biol Chem* 251: 6300-6303). Antibody:antigen crystals can be studied using well known X-ray diffraction techniques and can be refined using computer software such as X-PLOR (Yale University, 1992, distributed by Molecular Simulations, Inc.; see, e.g., Meth Enzymol (1985) volumes 114 & 115, eds Wyckoff H W et al.; U.S. 2004/0014194), and BUSTER (Bricogne G (1993) *Acta Crystallogr D Biol Crystallogr* 49(Pt 1): 37-60; Bricogne G (1997) *Meth Enzymol* 276A: 361-423, ed Carter C W; Roversi P et al., (2000) *Acta Crystallogr D Biol Crystallogr* 56(Pt 10): 1316-1323). Mutagenesis mapping studies can be accomplished using any method known to one of skill in the art. See, e.g., Champe M et al., (1995) *J Biol Chem* 270: 1388-1394 and Cunningham B C & Wells J A (1989) *Science* 244: 1081-1085 for a description of mutagenesis techniques, including alanine scanning mutagenesis techniques.

The term "binds to the same epitope" with reference to two or more antibodies means that the antibodies bind to the same segment of amino acid residues, as determined by a given method. Techniques for determining whether antibodies bind to the same epitope with the antibodies described herein include, for example, epitope mapping methods, such as, x-ray analyses of crystals of antigen:antibody complexes which provides atomic resolution of the epitope and hydrogen/deuterium exchange mass spectrometry (HDX-MS). Other methods monitor the binding of the antibody to antigen fragments or mutated variations of the antigen where loss of binding due to a modification of an amino acid residue within the antigen sequence is often considered an indication of an epitope component. In addition, computational combinatorial methods for epitope mapping can also be used. These methods rely on the ability of the antibody of interest to affinity isolate specific short peptides from combinatorial phage display peptide libraries. Antibodies having the same VH and VL or the same CDR1, 2 and 3 sequences are expected to bind to the same epitope.

Antibodies that "compete with another antibody for binding to a target" refer to antibodies that inhibit (partially or completely) the binding of the other antibody to the target. Whether two antibodies compete with each other for binding to a target, i.e., whether and to what extent one antibody inhibits the binding of the other antibody to a target, can be determined using known competition experiments. In certain embodiments, an antibody competes with, and inhibits binding of another antibody to a target by at least 10%, 20%, 30%, 40%, 50%, 60%, 70%, 80%, 90% or 100%. The level of inhibition or competition can be different depending on which antibody is the "blocking antibody" (i.e., the cold antibody that is incubated first with the target). Competition assays can be conducted as described, for example, in Ed Harlow and David Lane, Cold Spring Harb Protoc; 2006; doi: 10.1101/pdb.prot4277 or in Chapter 11 of "Using Antibodies" by Ed Harlow and David Lane, Cold Spring Harbor Laboratory Press, Cold Spring Harbor, NY, USA 1999. Competing antibodies bind to the same epitope, an overlapping epitope or to adjacent epitopes (e.g., as evidenced by steric hindrance).

Other competitive binding assays include: solid phase direct or indirect radioimmunoassay (RIA), solid phase direct or indirect enzyme immunoassay (EIA), sandwich competition assay (see Stahli et al., *Methods in Enzymology* 9:242 (1983)); solid phase direct biotin-avidin EIA (see Kirkland et al., *J. Immunol.* 137:3614 (1986)); solid phase direct labeled assay, solid phase direct labeled sandwich assay (see Harlow and Lane, Antibodies: A Laboratory Manual, Cold Spring Harbor Press (1988)); solid phase direct label RIA using 1-125 label (see Morel et al., *Mol. Immunol.* 25(1):7(1988)); solid phase direct biotin-avidin EIA (Cheung et al., *Virology* 176:546 (1990)); and direct labeled RIA. (Moldenhauer et al., *Scand. J. Immunol.* 32:77 (1990)).

The term "monoclonal antibody," as used herein, refers to an antibody that displays a single binding specificity and affinity for a particular epitope or a composition of antibodies in which all antibodies display a single binding specificity and affinity for a particular epitope. Accordingly, the term "human monoclonal antibody" refers to an antibody or antibody composition that display(s) a single binding specificity and which has variable and optional constant regions derived from human germline immunoglobulin sequences. In one embodiment, human monoclonal antibodies are produced by a hybridoma which includes a B cell obtained from a transgenic non-human animal, e.g., a transgenic mouse, having a genome comprising a human heavy chain transgene and a light chain transgene fused to an immortalized cell.

The term "recombinant human antibody," as used herein, includes all human antibodies that are prepared, expressed, created or isolated by recombinant means, such as (a) antibodies isolated from an animal (e.g., a mouse) that is transgenic or trans-chromosomal for human immunoglobulin genes or a hybridoma prepared therefrom, (b) antibodies isolated from a host cell transformed to express the antibody, e.g., from a transfectoma, (c) antibodies isolated from a recombinant, combinatorial human antibody library, and (d) antibodies prepared, expressed, created or isolated by any other means that involve splicing of human immunoglobulin gene sequences to other DNA sequences. Such recombinant human antibodies comprise variable and constant regions that utilize particular human germline immunoglobulin sequences are encoded by the germline genes, but include subsequent rearrangements and mutations which occur, for example, during antibody maturation. As known in the art (see, e.g., Lonberg (2005) *Nature Biotech.* 23(9): 1117-1125), the variable region contains the antigen binding domain, which is encoded by various genes that rearrange to form an antibody specific for a foreign antigen. In addition to rearrangement, the variable region can be further modified by multiple single amino acid changes (referred to as somatic mutation or hypermutation) to increase the affinity of the antibody to the foreign antigen. The constant region will change in further response to an antigen (i.e., isotype switch). Therefore, the rearranged and somatically mutated nucleic acid molecules that encode the light chain and heavy chain immunoglobulin polypeptides in response to an antigen cannot have sequence identity with the original nucleic acid molecules, but instead will be substantially identical or similar (i.e., have at least 80% identity).

A "human" antibody (HuMAb) refers to an antibody having variable regions in which both the framework and CDR regions are derived from human germline immunoglobulin sequences. Furthermore, if the antibody contains a constant region, the constant region also is derived from human germline immunoglobulin sequences. The antibodies described herein can include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences. The terms "human" antibodies and "fully human" antibodies and are used synonymously.

A "humanized" antibody refers to an antibody in which some, most or all of the amino acids outside the CDR domains of a non-human antibody are replaced with corresponding amino acids derived from human immunoglobulins. In one embodiment of a humanized form of an antibody, some, most or all of the amino acids outside the CDR domains have been replaced with amino acids from human immunoglobulins, whereas some, most or all amino acids within one or more CDR regions are unchanged. Small additions, deletions, insertions, substitutions or modifications of amino acids are permissible as long as they do not abrogate the ability of the antibody to bind to a particular antigen. A "humanized" antibody retains an antigenic specificity similar to that of the original antibody.

As used herein, the term "de-immunized" or "de-immunization" refers to a process in which an antibody, or an antigen binding portion thereof, is modified to reduce its immunogenicity, e.g., in a human subject. For example, the heavy chain variable region (VH) and the light chain variable region (VL) sequences from the original antibody can be analyzed and a human T cell epitope "map" can be generated from each V region showing the location of epitopes in relation to complementarity-determining regions (CDRs) and other key residues within the sequence. Individual T cell epitopes from the T cell epitope map are analyzed in order to identify alternative amino acid substitutions with a low risk of altering activity of the final antibody. A range of alternative VH and VL sequences are designed comprising combinations of amino acid substitutions and these sequences are subsequently incorporated into a range of *B. burgdorferi* peptidoglycan-specific antibodies, or antigen binding portion thereof, for use in the diagnostic and treatment methods disclosed herein, which are then tested for function. Complete heavy and light chain genes comprising modified V and human C regions are then cloned into expression vectors and the subsequent plasmids introduced into cell lines for the production of whole antibody. The antibodies are then compared in appropriate biochemical and biological assays, and the optimal variant is identified. An antibody can be de-immunized by using methods described herein or by any other methods known in the art. See, e.g., WO 98/52976 or WO 00/34317.

A "chimeric antibody" refers to an antibody in which the variable regions are derived from one species and the constant regions are derived from another species, such as an antibody in which the variable regions are derived from a mouse antibody and the constant regions are derived from a human antibody.

The term "naturally-occurring" as used herein as applied to an object refers to the fact that an object can be found in nature. For example, a polypeptide or polynucleotide sequence that is present in an organism (including viruses) that can be isolated from a source in nature and which has not been intentionally modified by man in the laboratory is naturally-occurring.

A "polypeptide" refers to a chain comprising at least two consecutively linked amino acid residues, with no upper limit on the length of the chain. One or more amino acid residues in the protein can contain a modification such as, but not limited to, glycosylation, phosphorylation or disulfide bond formation. A "protein" can comprise one or more polypeptides.

The term "nucleic acid molecule," as used herein, is intended to include DNA molecules and RNA molecules. A nucleic acid molecule can be single-stranded or double-stranded, and can be cDNA.

The term "vector," as used herein, is intended to refer to a nucleic acid molecule capable of transporting another nucleic acid to which it has been linked. One type of vector is a "plasmid," which refers to a circular double stranded DNA loop into which additional DNA segments can be ligated. Another type of vector is a viral vector, wherein additional DNA segments can be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell, and thereby are replicated along with the host genome. Moreover, certain vectors are capable of directing the expression of genes to which they are operatively linked. Such vectors are referred to herein as "recombinant expression vectors" (or simply, "expression vectors") In general, expression vectors of utility in recombinant DNA techniques are often in the form of plasmids. In the present specification, "plasmid" and "vector" can be used interchangeably as the plasmid is the most commonly used form of vector. However, also included are other forms of expression vectors, such as viral vectors (e.g., replication defective retroviruses, adenoviruses and adeno-associated viruses), which serve equivalent functions.

The term "recombinant host cell" (or simply "host cell"), as used herein, is intended to refer to a cell that comprises a nucleic acid that is not naturally present in the cell, and maybe a cell into which a recombinant expression vector has been introduced. It should be understood that such terms are intended to refer not only to the particular subject cell but to the progeny of such a cell. Because certain modifications can occur in succeeding generations due to either mutation or environmental influences, such progeny cannot, in fact, be identical to the parent cell, but are still included within the scope of the term "host cell" as used herein.

As used herein, the term "linked" refers to the association of two or more molecules. The linkage can be covalent or non-covalent. The linkage also can be genetic (i.e., recombinantly fused). Such linkages can be achieved using a wide variety of art recognized techniques, such as chemical conjugation and recombinant protein production.

As used herein, "administering" refers to the physical introduction of a therapeutic agent or a composition comprising a therapeutic agent to a subject, using any of the various methods and delivery systems known to those skilled in the art. Preferred routes of administration for antibodies described herein include intravenous, intraperitoneal, intramuscular, subcutaneous, spinal or other parenteral routes of administration, for example by injection or infusion. The phrase "parenteral administration" as used herein means modes of administration other than enteral and topical administration, usually by injection, and includes, without limitation, intravenous, intraperitoneal, intramuscular, intraarterial, intrathecal, intralymphatic, intralesional, intracapsular, intraorbital, intracardiac, intradermal, transtracheal, subcutaneous, subcuticular, intraarticular, subcapsular, subarachnoid, intraspinal, epidural and intrasternal injection and infusion, as well as in vivo electroporation. Alternatively, an antibody described herein can be administered via a non-parenteral route, such as a topical, epidermal or mucosal route of administration, for example, intranasally, orally, vaginally, rectally, sublingually or topically. Administering can also be performed, for example, once, a plurality of times, and/or over one or more extended periods.

The terms "treat," "treating," and "treatment," as used herein, refer to any type of intervention or process performed on, or administering an active agent to, the subject with the objective of reversing, alleviating, ameliorating, inhibiting, or slowing down or preventing the progression, development, severity or recurrence of a symptom, complication, condition or biochemical indicia associated with a disease. Treatment can be of a subject having a disease or a subject who does not have a disease (e.g., for prophylaxis).

The term "diagnosis," as used herein, refers to methods that can be used to determine or predict whether a patient is suffering from a given disease or condition (e.g., Lyme disease-related pathologies), thereby identifying a subject who is suitable for a treatment. A skilled artisan can make a diagnosis on the basis of one or more diagnostic marker (e.g., level of *B. burgdorferi* peptidoglycan or level of antibodies against *B. burgdorferi* peptidoglycan), where the presence, absence, amount, or change in amount of the diagnostic marker is indicative of the presence, severity, or absence of the condition. In some embodiments, an increase in the level of *B. burgdorferi* peptidoglycan in a biological sample (e.g., synovial fluid) from a subject is indicative of Lyme disease. In some embodiments, an increase in the level of antibodies against *B. burgdorferi* peptidoglycan in a biological sample (e.g., synovial fluid or serum) from a subject is indicative of Lyme disease. The term "diagnosis" does not refer to the ability to determine the presence or absence of a particular disease or disorder with 100% accuracy, or even that a given course or outcome is more likely to occur than not. Instead, the skilled artisan will understand that the term "diagnosis" refers to an increased probability that a certain disease or disorder is present in the subject. In some embodiments, the term "diagnosis" includes one or more diagnostic methods of identifying a subject who has Lyme disease.

The composition for diagnosing Lyme disease (including Lyme disease-related pathologies, e.g., arthritis) includes an agent for measuring the level of *B. burgdorferi* peptidoglycan or the level of antibodies directed against *B. burgdorferi* peptidoglycan. Non-limiting examples of such agents include antibodies, or antigen-binding fragments thereof, that specifically bind to *B. burgdorferi* peptidoglycan or antibodies directed against *B. burgdorferi* peptidoglycan. In some embodiments, any assay that can measure antigen-antibody binding could be used to measure the level of *B. burgdorferi* peptidoglycan or the level of antibodies directed against *B. burgdorferi* peptidoglycan. Non-limiting examples of such assays include Surface Plasmon Resonance, Standard Dot and line Immunoblot techniques, and PCR-ELISA. Additional assays that can be used with the present disclosure include colorimetric assay, gas liquid chromatography, and mass spectrometry techniques.

As used herein, the term "subject" includes any human or non-human animal. The term "non-human animal" includes all vertebrates, e.g., mammals and non-mammals, such as non-human primates, sheep, dog, cow, chickens, amphibians, reptiles, etc.

The term "therapeutically effective amount" as used herein refers to an amount of a drug, alone or in combination with another therapeutic agent, effective to "treat" a disease or disorder in a subject or reduce the risk, potential, possibility or occurrence of a disease or disorder (e.g., Lyme disease). A "therapeutically effective amount" includes an amount of a drug or a therapeutic agent that provides some improvement or benefit to a subject having or at risk of having a disease or disorder (e.g., Lyme disease). Thus, a "therapeutically effective" amount is an amount that reduces the risk, potential, possibility or occurrence of a disease or provides disorder or some alleviation, mitigation, and/or reduces at least one indicator (e.g., arthritis), and/or decrease in at least one clinical symptom of a disease or disorder.

II. Methods of Diagnosing Lyme Disease

Disclosed herein are methods of diagnosing Lyme disease in a subject in need thereof comprising contacting an anti-peptidoglycan agent, e.g. an antibody or innate immunity protein that specifically binds to *B. burgdorferi* peptidoglycan with a biological sample of the subject and measuring the level of *B. burgdorferi* peptidoglycan in the sample. In some embodiments, a method of diagnosing Lyme disease in a subject in need thereof comprises contacting an antibody against an anti-peptidoglycan antibody (i.e., anti-idiotypic antibody) with a biological sample of the subject and measuring the level of anti-peptidoglycan antibody in the sample.

In some embodiments, the level of *B. burgdorferi* peptidoglycan in a biological sample is increased by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in a reference sample (e.g., sample of a subject who does not have Lyme disease). The subject who exhibits an increased level of *B. burgdorferi* peptidoglycan can be identified as a subject suspected of having Lyme disease.

In some embodiments, the level of antibody directed against *B. burgdorferi* peptidoglycan (i.e., anti-peptidoglycan antibody) in a biological sample is increased by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in a reference sample (e.g., sample of a subject who does not have Lyme disease). In some embodiments, a subject with an increased level of antibody directed against *B. burgdorferi* peptidoglycan has increased level of *B. burgdorferi* peptidoglycan. Accordingly, in certain embodiments, a subject who exhibits an increased level of antibody directed against *B. burgdorferi* peptidoglycan can be identified as a subject suspected of having Lyme disease.

In some embodiments, the reference sample (e.g., reference biological sample) can be obtained from the same subject wherein the reference sample was obtained prior to the onset of Lyme disease (i.e., prior to *B. burgdorferi* infection). In other embodiments, the reference sample can be obtained from a control subject or a population of control subjects who do not have Lyme disease, e.g., health control subjects.

In some embodiments, a biological sample comprises a tissue, cell, or bodily fluid (e.g., blood, plasma, saliva, synovial fluid, cerebral spinal fluid, or urine). In certain embodiments, a biological sample comprises serum, plasma, synovial fluid, cerebral spinal fluid, urine, or combinations thereof.

In certain embodiments, the level of *B. burgdorferi* peptidoglycan in a synovial fluid of a subject suspected of having Lyme disease is increased by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in a reference sample (e.g., sample of a subject who does not have Lyme disease).

In some embodiments, an increase in the level of anti-peptidoglycan antibody or innate immunity protein is observed both in the synovial fluid and serum. Accordingly, in certain embodiments, the level of anti-peptidoglycan antibody or innate immunity protein in a synovial fluid and/or serum of a subject suspected having Lyme disease is increased by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in a reference sample (e.g., sample of a subject who does not have Lyme disease).

In some embodiments, the level of anti-peptidoglycan antibody or innate immunity protein in the serum is lower than the level of anti-peptidoglycan antibody or innate immunity protein observed in the synovial fluid. In certain embodiments, the level of anti-peptidoglycan antibody or innate immunity protein in the serum is lower than the corresponding level in the synovial fluid by at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or more.

In some embodiments, the level of anti-peptidoglycan antibody or innate immunity protein in the serum is higher than the level of anti-peptidoglycan antibody or innate immunity protein observed in the synovial fluid. In certain embodiments, the level of anti-peptidoglycan antibody or innate immunity protein in the serum is higher than the corresponding level in the synovial fluid by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more.

In some embodiments, the level of *B. burgdorferi* peptidoglycan in the synovial fluid of a subject suspected of having Lyme disease is at least about 0.5 pg/mL, at least about 1 pg/mL, at least about 5 pg/mL, at least about 10

µg/mL, at least about 20 µg/mL, at least about 30 µg/mL, at least about 40 µg/mL, at least about 50 µg/mL, at least about 60 µg/mL, at least about 70 µg/mL, at least about 80 µg/mL, at least about 90 µg/mL, at least about 100 µg/mL, at least about 150 µg/mL, at least about 200 µg/mL or more.

In some embodiments, methods disclosed herein can be used to diagnose the different stages of Lyme disease infection (i.e., Stages 1, 2, and 3, see supra). As shown in the Examples, Applicant has discovered that *B. burgdorferi* sheds large amounts of antigenic and immunogenic peptidoglycan fragments during its growth (almost 50% per generation). Accordingly, in some embodiments, by measuring the level of *B. burgdorferi* peptidoglycan (either directly or indirectly through the level of anti-peptidoglycan), diagnostic methods disclosed herein can be used to diagnose both early and late stage Lyme disease infection. The ability to diagnose early stage infection, for example within about 1 week, within about 2 weeks, within about 3 weeks is particularly advantageous as early treatment can mitigate and/or prevent the more serious symptoms of Lyme disease (e.g., arthritis or neuroborreliosis). Currently, there are no reliable methods for detecting early stage Lyme disease infection.

In some embodiments, in addition to increased levels of *B. burgdorferi* peptidoglycan and/or antibodies directed against *B. burgdorferi* peptidoglycan, a subject suspected of having Lyme disease has increased level of one or more pro-inflammatory mediators in a biological sample (e.g., synovial fluid or serum). In certain embodiments, the level of pro-inflammatory mediators is increased by at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in a reference sample (e.g., sample of a subject who does not have Lyme disease).

Non-limiting examples of inflammatory mediators include TNF-α, IL-1α, IL-1β, IL-6, IL-8, IFN-γ, IL-17A, IL-17F, or combinations thereof. In some embodiments, the level of pro-inflammatory mediators in the synovial fluid is greater than the corresponding level in the serum in a subject suspected of having Lyme disease.

In some embodiments, the level of *B. burgdorferi* peptidoglycan, the level of anti-peptidoglycan antibody or innate immunity protein, and/or the level of proinflammatory mediators is measured by an immunohistochemistry, a Western blotting, a radioimmunoassay, an enzyme linked immunosorbent assay (ELISA), a radioimmunodiffusion, an immunoprecipitation assay, an Ouchterlony immunodiffusion method, a rocket immunoelectrophoresis, a tissue immunostaining method, a complement fixation assay, FACS, a protein chip, Surface Plasmon Resonance, Standard Dot and line Immunoblot techniques, PCR-ELISA, colorimetric assay, gas liquid chromatography, and mass spectrometry techniques.

In some embodiments, the level of *B. burgdorferi* peptidoglycan is measured by an assay using an anti-peptidoglycan antibody or innate immunity protein disclosed herein.

In some embodiments, the diagnosis of the present disclosure can be combined with one or more known diagnostic methods for Lyme disease, such as total IgG in whole cell sonicate as measured by immunoblot and/or ELISA, or VlsE C6 ELISA.

In some embodiments, one or more diagnostic tests can be used to rule out other serious medical conditions that can cause similar symptoms of Lyme disease, e.g., other forms of arthritis, such as rheumatoid arthritis, osteoarthritis, ankylosing spondylitis, or gout. In a situation where the subject has other serious medical conditions, the subject can be treated for the other serious medical conditions only without the treatment for Lyme disease. In other embodiments, the subject can be treated for the other serious medical conditions along with the Lyme disease.

In some embodiments, methods disclosed herein can be used to distinguish active *B. burgdorferi* infection from previous exposure. *B. burgdorferi* peptidoglycan fragments are released only during active growth of the bacteria, and detection of these unique epitopes can delineate current from previous exposure.

III. Methods of Treating Lyme Disease

Disclosed herein are also methods of treating, controlling, ameliorating, or reducing Lyme disease (e.g., one or more symptoms associated with Lyme disease, e.g., arthritis) in a subject in need thereof (e.g., a subject identified as having Lyme disease using the diagnostic methods disclosed herein). In some embodiments, the treatment of Lyme disease comprises administering to the subject an antagonist against *B. burgdorferi* peptidoglycan. As used herein, the term "antagonist" refers to a substance that can directly, indirectly, or substantially interfere with, reduce, or inhibit the biological activity of *B. burgdorferi* peptidoglycan.

In some embodiments, an antagonist is an antibody or innate immunity protein, or antigen-binding fragment thereof, that specifically binds to the *B. burgdorferi* peptidoglycan ("anti-peptidoglycan antibody"), a polynucleotide encoding the anti-peptidoglycan antibody, or a vector comprising the polynucleotide thereof. In some embodiments, an anti-peptidoglycan antibody or innate immunity protein binds to *B. burgdorferi* peptidoglycan and reduces the activity of *B. burgdorferi* peptidoglycan.

In some embodiments, an antagonist is an enzyme that can degrade the *B. burgdorferi* peptidoglycan. Non-limiting examples of such an enzyme includes peptidoglycan-specific hydrolase, such as an amidase or a lysozyme that can degrade the pro-inflammatory peptidoglycan remnants. Accordingly, in some embodiments, a therapeutic method disclosed herein comprises administering to the subject a therapeutically effective amount of a peptidoglycan-specific hydrolase that specifically degrades *B. burgdorferi* peptidoglycan. In certain embodiments, the peptidoglycan-specific hydrolase degrades *B. burgdorferi* peptidoglycan at the site of inflammation.

As shown in the Examples, Applicant has discovered that *B. burgdorferi* peptidoglycan can induce cells (e.g., human peripheral blood mononuclear cells) to produce pro-inflammatory mediators upon stimulation. Accordingly, in some embodiments, an antagonist (e.g., an anti-peptidoglycan antibody disclosed herein), when administered to a subject, can bind and neutralize the activity of *B. burgdorferi* peptidoglycan, and thereby, reduce the release of such pro-inflammatory mediators. And, by reducing the release of pro-inflammatory mediators, methods disclosed herein can treat, control, ameliorate, or reduce Lyme disease (e.g., one or more symptoms associated with Lyme disease, e.g., arthritis).

In some embodiments, the level of pro-inflammatory mediators in a subject suspected of having Lyme disease is reduced by at least about 5%, at least about 10%, at least about 20%, at least about 30%, at least about 40%, at least about 50%, at least about 60%, at least about 70%, at least about 80%, at least about 90% or more compared to a reference (e.g., corresponding level in a Lyme disease subject not treated with an antagonist disclosed herein (e.g., the anti-peptidoglycan antibody), e.g., corresponding level in the subject immediately prior to the antagonist administration).

Non-limiting examples of inflammatory mediators include TNF-α, IL-1α, IL-1β, IL-6, IL-8, IFN-γ, CCL2, CCL3, CXCL10, IL-17A, IL-17F, or combinations thereof. In some embodiments, the level of pro-inflammatory mediators in the synovial fluid is greater than the corresponding level in the serum in a subject suspected of having Lyme disease.

In some embodiments, therapeutic methods disclosed herein can comprise administering multiple antagonists to a subject (e.g., anti-peptidoglycan antibody and a peptidoglycan-specific hydrolase). In such embodiments, the multiple antagonists can be administered concurrently or sequentially. In some embodiments, therapeutic methods disclosed herein can be used in conjunction with one or more additional agents for the treatment of Lyme disease. In certain embodiments, the one or more additional agents comprise an antibiotic. Non-limiting examples of antibiotics include doxycycline, amoxicillin, ceftriaxone, or combinations thereof.

In some embodiments, an antagonist of the present disclosure (e.g., anti-peptidoglycan antibody) is administered to the subject intravenously, orally, parenterally, intrathecally, intra-cerebroventricularly, pulmonarily, intramuscularly, subcutaneously, intravitreally, or intraventricularly.

In some embodiments a subject diagnosed by the methods disclosed herein is treated with an antibiotic. The term "antibiotic" as used herein includes all commonly used bacteristatic and bactericidal antibiotics, usually those administered orally. Antibiotics include aminoglycosides, such as amikacin, gentamicin, kanamycin, neomycin, streptomycin, and tobramycin; cephalosporins, such as cefamandole, cefazolin, cephalexin, cephaloglycin, cephaloridine, cephalothin, cephapirin, and cephradine; macrolides, such as erythromycin and troleandomycin; penicillins, such as penicillin G, amoxicillin, ampicillin, carbenicillin, cloxacillin, dicloxacillin, methicillin, nafcillin, oxacillin, phenethicillin, and ticarcillin; polypeptide antibiotics, such as bacitracin, colistimethate, colistin, polymyxin B; tetracyclines, such as chlortetracycline, demeclocycline, doxycycline, methacycline, minocycline, tetracycline, and oxytetracycline; and miscellaneous antibiotics such as chloramphenicol, clindamycin, cycloserine, lincomycin, rifampin, spectinomycin, vancomycin, and viomycin. Additional antibiotics are described in "Remington's Pharmaceutical Sciences," 16th Ed., (Mack Pub. Co., 1980), pp. 1121-1178.

IV. Antibodies Against *B. burgdorferi* Peptidoglycan

Antibodies that are useful in the methods disclosed herein include antibodies (both monoclonal and polyclonal), which are characterized by particular functional features or properties. For example, in some embodiments, the antibodies specifically bind to *B. burgdorferi* peptidoglycan and neutralize its activity. Standard assays to evaluate the binding ability of an antibody to its antigen are known in the art, including for example, ELISAs, Western blots, and RIAs. The binding kinetics (e.g., binding affinity) of the antibodies also can be assessed by standard assays known in the art, such as by ELISA, BIACORE™ analysis or KINEXA®.

In some embodiments, an anti-peptidoglycan antibody disclosed herein is not a native antibody or is not naturally-occurring. For example, in certain embodiments, an anti-peptidoglycan antibody can have post-translational modifications that are different from those of antibodies that are naturally-occurring, such as by having more, less or a different type of post-translational modification.

V. Nucleic Acids, Vectors, and Cells

Another aspect described herein pertains to one or more nucleic acid molecules that encode an antibody described herein. The nucleic acids can be present in whole cells, in a cell lysate, or in a partially purified or substantially pure form. A nucleic acid is "isolated" or "rendered substantially pure" when purified away from other cellular components or other contaminants, e.g., other cellular nucleic acids (e.g., other chromosomal DNA, e.g., the chromosomal DNA that is linked to the isolated DNA in nature) or proteins, by standard techniques, including alkaline/SDS treatment, CsCl banding, column chromatography, restriction enzymes, agarose gel electrophoresis and others well known in the art. See F. Ausubel et al., ed. Current Protocols in Molecular Biology, Greene Publishing and Wiley Interscience, New York (1987). A nucleic acid described herein can be, for example, DNA or RNA and can or cannot contain intronic sequences. In certain embodiments, the nucleic acid is a cDNA molecule.

Nucleic acids described herein can be obtained using standard molecular biology techniques. For antibodies expressed by hybridomas (e.g., hybridomas prepared from transgenic mice carrying human immunoglobulin genes as described further below), cDNAs encoding the light and heavy chains of the antibody made by the hybridoma can be obtained by standard PCR amplification or cDNA cloning techniques. For antibodies obtained from an immunoglobulin gene library (e.g., using phage display techniques), nucleic acid encoding the antibody can be recovered from the library.

A method for making an anti-peptidoglycan antibody disclosed herein can comprise expressing the relevant heavy chain and light chain of the antibody in a cell line comprising the nucleotide sequences encoding the heavy and light chains with a signal peptide. Host cells comprising these nucleotide sequences are encompassed herein.

Once DNA fragments encoding VH and VL segments are obtained, these DNA fragments can be further manipulated by standard recombinant DNA techniques, for example to convert the variable region genes to full-length antibody chain genes, to Fab fragment genes or to a scFv gene. In these manipulations, a VL- or VH-encoding DNA fragment is operatively linked to another DNA fragment encoding another protein, such as an antibody constant region or a flexible linker. The term "operatively linked", as used in this context, is intended to mean that the two DNA fragments are joined such that the amino acid sequences encoded by the two DNA fragments remain in-frame.

The isolated DNA encoding the VH region can be converted to a full-length heavy chain gene by operatively linking the VH-encoding DNA to another DNA molecule encoding heavy chain constant regions (hinge, CH1, CH2 and/or CH3). The sequences of human heavy chain constant region genes are known in the art (see e.g., Kabat, E. A., et al., (1991) Sequences of Proteins of Immunological Interest, Fifth Edition, U.S. Department of Health and Human Services, NIH Publication No. 91-3242) and DNA fragments encompassing these regions can be obtained by standard PCR amplification. The heavy chain constant region can be an IgG1, IgG2, IgG3, IgG4, IgA, IgE, IgM or IgD constant region, for example, an IgG2 and/or IgG 4 constant region. For a Fab fragment heavy chain gene, the VH-encoding DNA can be operatively linked to another DNA molecule encoding only the heavy chain CH1 constant region.

The isolated DNA encoding the VL region can be converted to a full-length light chain gene (as well as a Fab light chain gene) by operatively linking the VL-encoding DNA to another DNA molecule encoding the light chain constant region, CL. The sequences of human light chain constant region genes are known in the art (see e.g., Kabat, E. A., et al., (1991) Sequences of Proteins of Immunological Interest, Fifth Edition, U.S. Department of Health and Human Services, NIH Publication No. 91-3242) and DNA fragments encompassing these regions can be obtained by standard PCR amplification. The light chain constant region can be a kappa or lambda constant region.

To create a scFv gene, the VH- and VL-encoding DNA fragments are operatively linked to another fragment encoding a flexible linker, e.g., encoding the amino acid sequence (Gly4-Ser)3, such that the VH and VL sequences can be expressed as a contiguous single-chain protein, with the VL and VH regions joined by the flexible linker (see, e.g., Bird et al., *Science* 242:423-426 (1988); Huston et al., *Proc. Natl. Acad. Sci. USA* 85:5879-5883 (1988); McCafferty et al., *Nature* 348:552-554 (1990)).

In some embodiments, the vector disclosed herein comprises an isolated nucleic acid molecule comprising a nucleotide sequence encoding an antibody, or antigen-binding fragment thereof. In certain embodiments, the vectors can be used for gene therapy. Suitable vectors for the disclosure include expression vectors, viral vectors, and plasmid vectors.

As used herein, an"expression vector" refers to any nucleic acid construct that contains the necessary elements for the transcription and translation of an inserted coding sequence, or in the case of an RNA viral vector, the necessary elements for replication and translation, when introduced into an appropriate host cell. Expression vectors can include plasmids, phagemids, viruses, and derivatives thereof.

A variety of host-expression vector systems can be utilized to express an antibody described herein. Such host-expression systems represent vehicles by which the coding sequences of interest can be produced and subsequently purified, but also represent cells which can, when transformed or transfected with the appropriate nucleotide coding sequences, express an antibody molecule described herein in situ. These include but are not limited to microorganisms such as bacteria (e.g., *Escherichia coli* and *Bacillus subtilis*) transformed with recombinant bacteriophage DNA, plasmid DNA or cosmid DNA expression vectors containing antibody coding sequences; yeast (e.g., *Saccharomyces Pichia*) transformed with recombinant yeast expression vectors containing antibody coding sequences; insect cell systems infected with recombinant virus expression vectors (e.g., baculovirus) containing antibody coding sequences; plant cell systems (e.g., green algae such as *Chlamydomonas reinhardtii*) infected with recombinant virus expression vectors (e.g., cauliflower mosaic virus, CaMV; tobacco mosaic virus, TMV) or transformed with recombinant plasmid expression vectors (e.g., Ti plasmid) containing antibody coding sequences; or mammalian cell systems (e.g., COS (e.g., COS1 or COS), CHO, BHK, MDCK, HEK 293, NSO, PER.C6, VERO, CRL7030, HsS78Bst, HeLa, and NIH 3T3, HEK-293T, HepG2, SP210, R1.l, B-W, L-M, BSCI, BSC40, YB/20 and BMT10 cells) harboring recombinant expression constructs containing promoters derived from the genome of mammalian cells (e.g., metallothionein promoter) or from mammalian viruses (e.g., the adenovirus late promoter; the vaccinia virus 7.5K promoter). In a specific embodiment, cells for expressing antibodies described herein or an antigen-binding fragment thereof are CHO cells, for example CHO cells from the CHO GS SYSTEM™ (Lonza). In a particular embodiment, cells for expressing antibodies described herein are human cells, e.g., human cell lines. In a specific embodiment, a mammalian expression vector is POPTIVEC™ or pcDNA3.3. In a particular embodiment, bacterial cells such as *Escherichia coli,* or eukaryotic cells (e.g., mammalian cells), especially for the expression of whole recombinant antibody molecule, are used for the expression of a recombinant antibody molecule. For example, mammalian cells such as Chinese hamster ovary (CHO) cells, in conjunction with a vector such as the major intermediate early gene promoter element from human cytomegalovirus is an effective expression system for antibodies (Foecking M K & Hofstetter H (1986) *Gene* 45: 101-5; and Cockett M I et al., (1990) *Biotechnology* 8(7): 662-7). In certain embodiments, antibodies described herein are produced by CHO cells or NSO cells. In a specific embodiment, the expression of nucleotide sequences encoding antibodies described herein which specifically bind *B. burgdorferi* peptidoglycan is regulated by a constitutive promoter, inducible promoter or tissue specific promoter.

VI. Antibody Production

Anti-peptidoglycan antibody disclosed herein can be produced by any method known in the art for the synthesis of antibodies, for example, by chemical synthesis or by recombinant expression techniques. The methods described herein employ, unless otherwise indicated, conventional techniques in molecular biology, microbiology, genetic analysis, recombinant DNA, organic chemistry, biochemistry, PCR, oligonucleotide synthesis and modification, nucleic acid hybridization, and related fields within the skill of the art. These techniques are described, for example, in the references cited herein and are fully explained in the literature. See, e.g., Maniatis T et al., (1982) Molecular Cloning: A Laboratory Manual, Cold Spring Harbor Laboratory Press; Sambrook J et al., (1989), Molecular Cloning: A Laboratory Manual, Second Edition, Cold Spring Harbor Laboratory Press; Sambrook J et al., (2001) Molecular Cloning: A Laboratory Manual, Cold Spring Harbor Laboratory Press, Cold Spring Harbor, NY; Ausubel F M et al., Current Protocols in Molecular Biology, John Wiley & Sons (1987 and annual updates); Current Protocols in Immunology, John Wiley & Sons (1987 and annual updates) Gait (ed.) (1984) Oligonucleotide Synthesis: A Practical Approach, IRL Press; Eckstein (ed.) (1991) Oligonucleotides and Analogues: A Practical Approach, IRL Press; Birren B et al., (eds.) (1999) Genome Analysis: A Laboratory Manual, Cold Spring Harbor Laboratory Press.

In some embodiments, an antibody described herein is an antibody (e.g., recombinant antibody) prepared, expressed, created, or isolated by any means that involves creation, e.g., via synthesis, genetic engineering of DNA sequences. In certain embodiments, such antibody comprises sequences (e.g., DNA sequences or amino acid sequences) that do not naturally exist within the antibody germline repertoire of an animal or mammal (e.g., human) in vivo.

VII. Pharmaceutical Compositions

Provided herein are compositions comprising an antibody or antigen-binding fragment thereof described herein having the desired degree of purity in a physiologically acceptable carrier, excipient or stabilizer (Remington's Pharmaceutical Sciences (1990) Mack Publishing Co., Easton, PA). Acceptable carriers, excipients, or stabilizers are nontoxic to recipients at the dosages and concentrations employed, and include buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN®, PLURONICS® or polyethylene glycol (PEG).

In a specific embodiment, pharmaceutical compositions comprise an antibody or antigen-binding fragment thereof, a bispecific molecule, or a immunoconjugate described herein, and optionally one or more additional prophylactic or therapeutic agents, in a pharmaceutically acceptable carrier. In a specific embodiment, pharmaceutical compositions comprise an effective amount of an antibody or antigen-binding fragment thereof described herein, and optionally one or more additional prophylactic of therapeutic agents, in a pharmaceutically acceptable carrier. In some embodiments, the antibody is the only active ingredient included in the pharmaceutical composition. Pharmaceutical compositions described herein can be useful in reducing a *B. burgdorferi* peptidoglycan activity and thereby treat Lyme disease.

Pharmaceutically acceptable carriers used in parenteral preparations include aqueous vehicles, nonaqueous vehicles, antimicrobial agents, isotonic agents, buffers, antioxidants, local anesthetics, suspending and dispersing agents, emulsifying agents, sequestering or chelating agents and other pharmaceutically acceptable substances. Examples of aqueous vehicles include Sodium Chloride Injection, Ringers Injection, Isotonic Dextrose Injection, Sterile Water Injection, Dextrose and Lactated Ringers Injection. Nonaqueous parenteral vehicles include fixed oils of vegetable origin, cottonseed oil, corn oil, sesame oil and peanut oil. Antimicrobial agents in bacteriostatic or fungistatic concentrations can be added to parenteral preparations packaged in multiple-dose containers which include phenols or cresols, mercurials, benzyl alcohol, chlorobutanol, methyl and propyl p-hydroxybenzoic acid esters, thimerosal, benzalkonium chloride and benzethonium chloride. Isotonic agents include sodium chloride and dextrose. Buffers include phosphate and citrate. Antioxidants include sodium bisulfate. Local anesthetics include procaine hydrochloride. Suspending and dispersing agents include sodium carboxymethylcelluose, hydroxypropyl methylcellulose and polyvinylpyrrolidone. Emulsifying agents include Polysorbate 80 (TWEEN® 80). A sequestering or chelating agent of metal ions includes EDTA. Pharmaceutical carriers also include ethyl alcohol, polyethylene glycol and propylene glycol for water miscible vehicles; and sodium hydroxide, hydrochloric acid, citric acid or lactic acid for pH adjustment.

A pharmaceutical composition can be formulated for any route of administration to a subject. Specific examples of routes of administration include intranasal, oral, parenterally, intrathecally, intra-cerebroventricularly, pulmonarily, subcutaneously, or intraventricularly. Parenteral administration, characterized by either subcutaneous, intramuscular or intravenous injection, is also contemplated herein. Injectables can be prepared in conventional forms, either as liquid solutions or suspensions, solid forms suitable for solution or suspension in liquid prior to injection, or as emulsions. The injectables, solutions and emulsions also contain one or more excipients. Suitable excipients are, for example, water, saline, dextrose, glycerol or ethanol. In addition, if desired, the pharmaceutical compositions to be administered can also contain minor amounts of non-toxic auxiliary substances such as wetting or emulsifying agents, pH buffering agents, stabilizers, solubility enhancers, and other such agents, such as for example, sodium acetate, sorbitan monolaurate, triethanolamine oleate and cyclodextrins.

Preparations for parenteral administration of an antibody include sterile solutions ready for injection, sterile dry soluble products, such as lyophilized powders, ready to be combined with a solvent just prior to use, including hypodermic tablets, sterile suspensions ready for injection, sterile dry insoluble products ready to be combined with a vehicle just prior to use and sterile emulsions. The solutions can be either aqueous or nonaqueous.

If administered intravenously, suitable carriers include physiological saline or phosphate buffered saline (PBS), and solutions containing thickening and solubilizing agents, such as glucose, polyethylene glycol, and polypropylene glycol and mixtures thereof.

Topical mixtures comprising an antibody are prepared as described for the local and systemic administration. The resulting mixture can be a solution, suspension, emulsions or the like and can be formulated as creams, gels, ointments, emulsions, solutions, elixirs, lotions, suspensions, tinctures, pastes, foams, aerosols, irrigations, sprays, suppositories, bandages, dermal patches or any other formulations suitable for topical administration.

An antibody or antigen-binding fragment thereof described herein can be formulated as an aerosol for topical application, such as by inhalation (see, e.g., U.S. Pat. Nos. 4,044,126, 4,414,209 and 4,364,923, which describe aerosols for delivery of a steroid useful for treatment of inflammatory diseases, particularly asthma). These formulations for administration to the respiratory tract can be in the form of an aerosol or solution for a nebulizer, or as a microfine powder for insufflations, alone or in combination with an inert carrier such as lactose. In such a case, the particles of the formulation will, in one embodiment, have diameters of less than 50 microns, in one embodiment less than 10 microns.

An antibody, or antigen-binding fragment thereof, described herein can be formulated for local or topical application, such as for topical application to the skin and mucous membranes, such as in the eye, in the form of gels, creams, and lotions and for application to the eye or for intracisternal or intraspinal application. Topical administration is contemplated for transdermal delivery and also for administration to the eyes or mucosa, or for inhalation therapies. Nasal solutions of the antibody alone or in combination with other pharmaceutically acceptable excipients can also be administered.

Transdermal patches, including iontophoretic and electrophoretic devices, are well known to those of skill in the art, and can be used to administer an antibody. For example, such patches are disclosed in U.S. Pat. Nos. 6,267,983, 6,261,595, 6,256,533, 6,167,301, 6,024,975, 6,010715, 5,985,317, 5,983,134, 5,948,433, and 5,860,957.

In certain embodiments, a pharmaceutical composition comprising an antibody or antigen-binding fragment thereof described herein is a lyophilized powder, which can be reconstituted for administration as solutions, emulsions and other mixtures. It can also be reconstituted and formulated as solids or gels. The lyophilized powder is prepared by dissolving an antibody or antigen-binding fragment thereof described herein, or a pharmaceutically acceptable derivative thereof, in a suitable solvent. In some embodiments, the lyophilized powder is sterile. The solvent can contain an excipient which improves the stability or other pharmacological component of the powder or reconstituted solution, prepared from the powder. Excipients that can be used include, but are not limited to, dextrose, sorbitol, fructose, corn syrup, xylitol, glycerin, glucose, sucrose or other suitable agent. The solvent can also contain a buffer, such as citrate, sodium or potassium phosphate or other such buffer known to those of skill in the art at, in one embodiment, about neutral pH. Subsequent sterile filtration of the solution followed by lyophilization under standard conditions known to those of skill in the art provides the desired formulation. In one embodiment, the resulting solution will be apportioned into vials for lyophilization. Each vial will contain a single dosage or multiple dosages of the compound. The lyophilized powder can be stored under appropriate conditions, such as at about 4° C. to room temperature.

Reconstitution of this lyophilized powder with water for injection provides a formulation for use in parenteral administration. For reconstitution, the lyophilized powder is added to sterile water or another suitable carrier. The precise amount depends upon the selected compound. Such amount can be empirically determined.

The antibodies, or antigen-binding fragments thereof, the bispecific molecule, or the immunoconjugate described herein and other compositions provided herein can also be formulated to be targeted to a particular tissue, receptor, or other area of the body of the subject to be treated. Many such targeting methods are well known to those of skill in the art. All such targeting methods are contemplated herein for use in the instant compositions. For non-limiting examples of targeting methods, see, e.g., U.S. Pat. Nos. 6,316,652, 6,274,552, 6,271,359, 6,253,872, 6,139,865, 6,131,570, 6,120,751, 6,071,495, 6,060,082, 6,048,736, 6,039,975, 6,004,534, 5,985,307, 5,972,366, 5,900,252, 5,840,674, 5,759,542 and 5,709,874. In a specific embodiment, the anti-peptidoglycan antibody or antigen-binding fragment thereof described herein can be used treat Lyme disease.

The compositions to be used for in vivo administration can be sterile. This is readily accomplished by filtration through, e.g., sterile filtration membranes.

VIII. Kits

Provided herein are kits comprising one or more antibodies described herein, or antigen-binding fragments thereof, wherein the kits are for diagnostic or treatment. In a specific embodiment, provided herein is a pack or kit comprising one or more containers filled with one or more of the ingredients of the compositions described herein, such as one or more antibodies provided herein or an antigen-binding fragment thereof, optional an instructing for use. In some embodiments, the kits contain a composition described herein and any diagnostic, prophylactic or therapeutic agent, such as those described herein.

The following examples are offered by way of illustration and not by way of limitation. The contents of all references cited throughout this application are expressly incorporated herein by reference.

EXAMPLES

Example 1 Analysis of the Release of *B. burgdorferi* Peptidoglycan Fragments into the Extracellular Environment To begin assessing whether the level of *B. burgdorferi* peptidoglycan could be used to diagnose individuals having Lyme disease, the peptidoglycan turnover of *B. burgdorferi* was examined. Peptidoglycan was pulse-labeled with L-ornithine containing $^3$H or $^{14}$C isotopes, followed by outgrowth in culture medium. At various time points during outgrowth, cells were collected, peptidoglycan was purified and analyzed by liquid scintillation. The shedding of peptidoglycan fragments into the extracellular environment was assessed by exposing human NOD2 (hNOD2) reporter cells to culture supernatants. Peptidoglycan material present in culture supernatants bind to Nod2 receptors, resulting in downstream activation of NF-kB (Girardin et al, *J. Biol Chem*, 278(11):8869-8872 (2003)).

Figure 8:
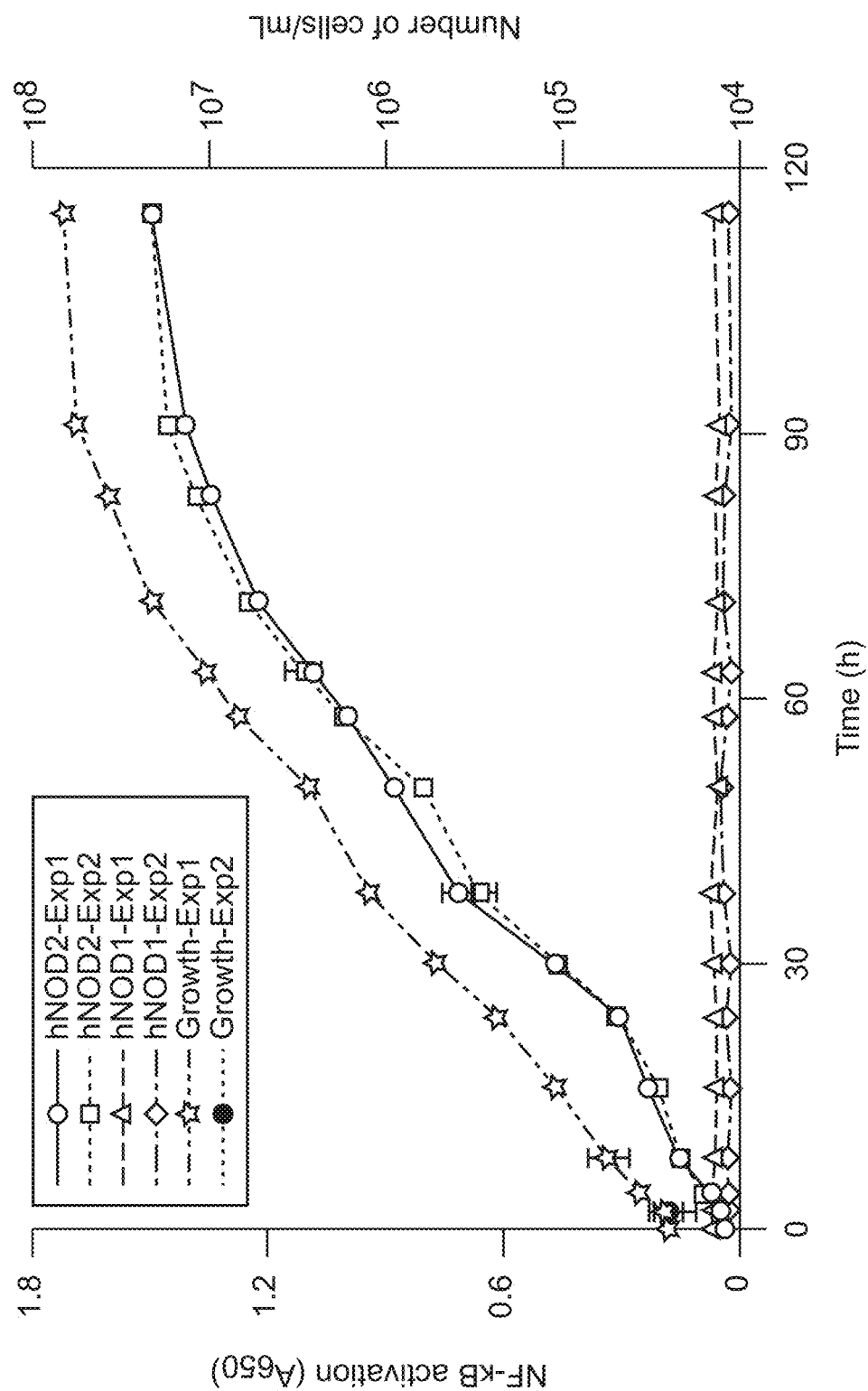
FIG. 8. Time-course analysis of muropeptide accumulation in the culture medium during B. burgdorferi growth. Batch cultures of B. burgdorferi were monitored for growth and muropeptide release using human NOD2 and NOD1 reporter cells (hNOD1 and hNOD2). At each time point (dots), a fraction of two independent cultures was removed, the density determined in cells/mL using a counting chamber (black and grey lines) and supernatants collected, processed, and assayed for hNOD1 or hNOD2 activation by monitoring NF-κB activity. Replicate cultures were analyzed in tandem (Exp 1 and 2) and each sample was analyzed in triplicate. Data points are the mean±standard deviation for each experiment. Note that the black line largely covers the grey line because of their overlap.
Figure 9:
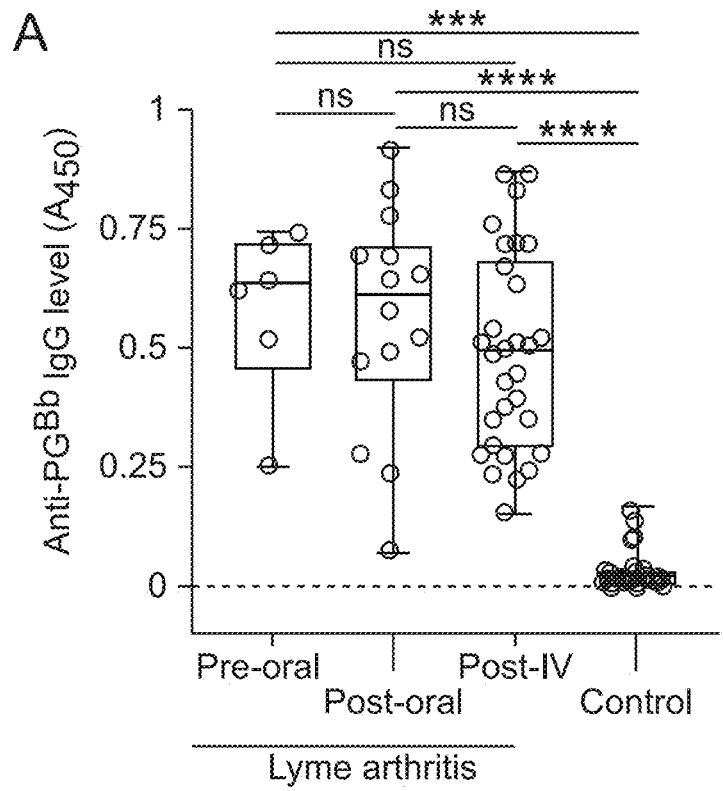
FIG. 9. Analysis of human Lyme arthritis synovial fluids based on treatment stage. (A) Box plot showing the levels of anti-PG$^{Bb}$ IgG in synovial fluid samples of Lyme arthritis (LA) patients based on treatment stage, i.e., before oral antibiotic treatment (pre-oral, n=6), after oral antibiotic treatment (post-oral, n=14) or after both oral and intravenous antibiotic treatment (post-IV, n=30) as determined by ELISA (see FIG. 2A). Included are control synovial fluid samples from patients suffering from a torn ACL (n=1) or other forms of arthritis (n=32). A Kruskal-Wallis test on the four groups resulted in p<0.0001. Kruskal-Wallis test followed by a Dunn's post-hoc pairwise test revealed that the anti-PG$^{Bb}$ IgG level of all LA sample groups (stage (pre-oral, post-oral or post-IV antibiotic) was statistically significant different from the control group (** indicates p<0.0001 whereas * indicates p<0.001). In contrast, there was no significant difference (ns) in anti-PG$^{Bb}$ IgG levels between the different LA sample groups (adjusted p>0.99). (B) Box plot showing the concentration of PG$^{Bb}$ in LA samples organized by treatment stage: before oral antibiotic treatment (n=6), after oral antibiotic treatment (n=8) or after both oral and intravenous antibiotic treatment (n=20) based on a competitive ELISA using anti-serum raised against PG$^{Bb}$. Only patients with available synovial and serum samples were considered in this assay. Kruskal-Wallis test comparing the three groups yielded p=0.1. (C) Table showing the results of PCR, anti-PG$^{Bb}$ IgG and PG-concentration analyses for the serum and synovial fluid samples of 34 LA patients at different treatment stages of disease.
Figure 9:
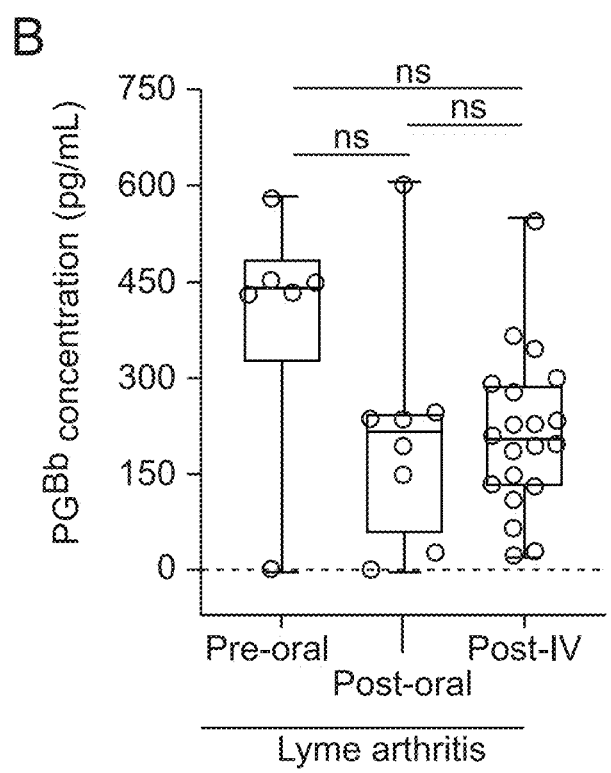

As shown in FIG. 1B, after a single generation, the percentage of peptidoglycan that was radioisotope-labeled was reduced to about 50%. After 7 generations, only about 5% of the *B. burgdorferi* peptidoglycan were labeled with radioisotope. With each generation, approximately 40% of *B. burgdorferi* peptidoglycan had undergone turnover. This data demonstrates that the peptidoglycan of *B. burgdorferi* undergoes active turnover during growth unlike other bacteria (Park and Uehara, *Microbiol Mol Rev* 72, 211-227 (2008))). In addition, and as shown by the increase in NF-kB activity in FIG. 1C, peptidoglycan turnover during *B. burgdorferi* growth resulted in accumulation of peptidoglycan fragment in culture supernatants over time. Gefitinib, an inhibitor of the adaptor protein RIP2 downstream Nod2 (Tigno-Aranjuez et al., *Genes Dev* 24(23):2666-2677 (2010)), confirmed that NF-kB activation was due to Nod2 receptor binding activity. In addition, human Nod1 reporter cells, which cannot recognize the *B. burgdorferi* ornithine-containing peptidoglycan (Girardin et al., *J. Biol Chem*, 278(11):8869-8872 (2003)), did not lead to NF-kB activation upon exposure to *B. burgdorferi* culture supernatants (FIG. 8).

Example 2 Comparison of IgG Response to Different Types of Bacterial Peptidoglycan in Lyme Arthritis Patients To assess whether Lyme arthritis patients generate an immune response against *B. burgdorferi* peptidoglycan, synovial fluid samples were collected from Lyme arthritis patients and the level of antibodies directed against *B. burgdorferi* peptidoglycan was measured using ELISA. Synovial fluid samples from non-Lyme disease patients (rheumatoid arthritis, osteoarthritis, ankylosing spondylitis, gout, or torn ACL) were used as controls. To assess the specificity of the antibodies directed against *B. burgdorferi*, the levels of antibodies directed against other types of bacterial peptidoglycans were also assessed. *Escherichia coli*, *Bacillus subtilis*, and *Staphylococcus aureus* peptidoglycan was purified and used to measure patient IgG levels.

All patient responses were normalized independently, to absorbance levels attained in the absence of ligand (background signal).

Figure 2:
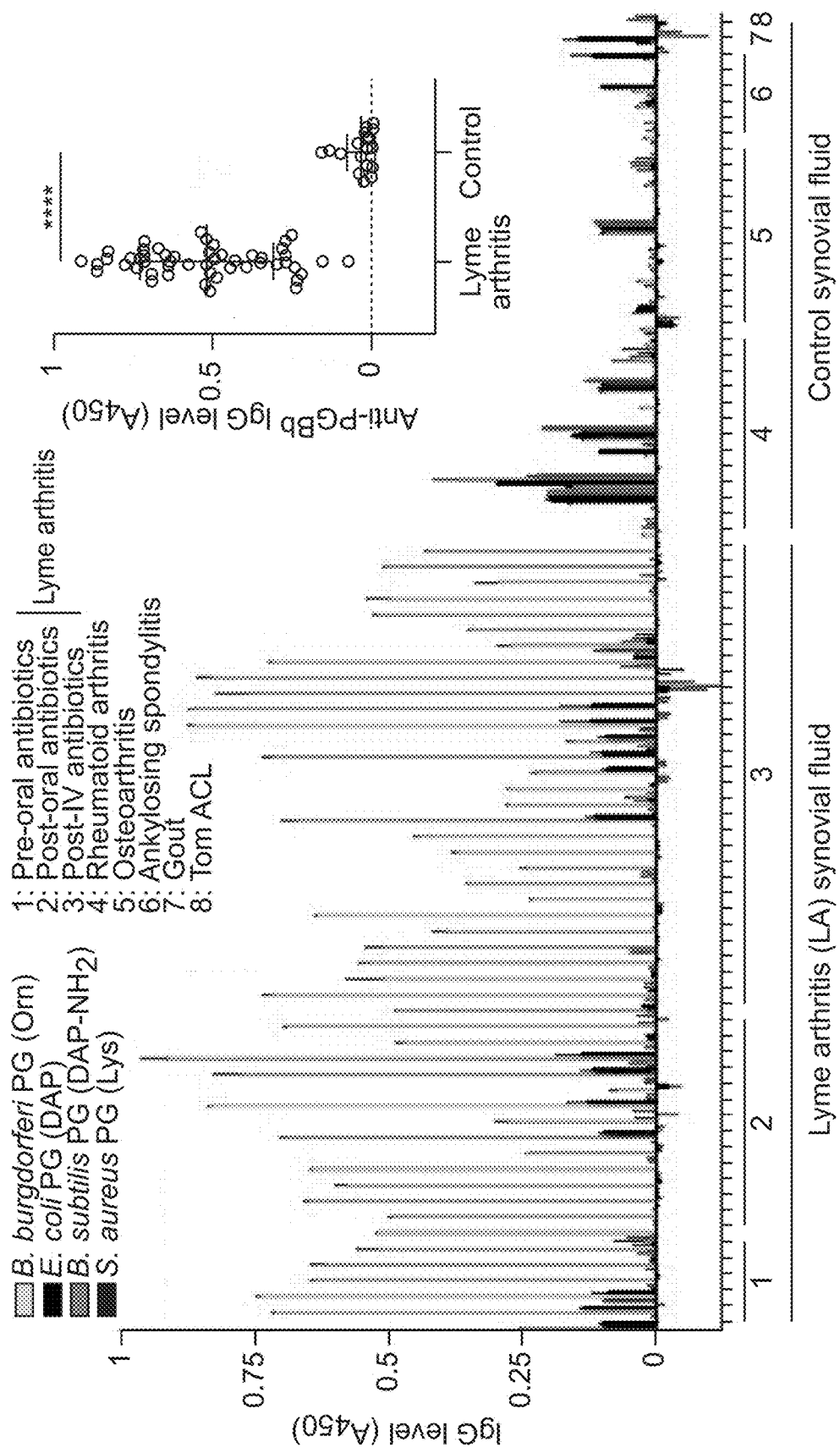
FIG. 2. Patients with Lyme arthritis (LA) develop an adaptive immune response specifically to *B. burgdorferi* peptidoglycan ($PG^{Bb}$). Purified peptidoglycan from *B. burgdorferi* B31, *E. coli* K-12, *S. aureus* SA113, or *B. subtilis* 168 was immobilized, and synovial fluid from patients with different types of arthritis (groups 1-6 and 7) were blindly assayed for the presence of IgG by ELISA (****$P<0.0001$, Kruskal-Wallis test followed by Dunn's post hoc pairwise test for B and Mann-Whitney U test for A and D). Horizontal black lines indicate means and SDs. (A) Levels of IgG against different peptidoglycan types. After the results were obtained, the patient sample type was decoded and organized based on the arthritis type and treatment stage. Results for a control joint fluid sample obtained from a patient with a torn ACL (group 8) were also included. Values were background-subtracted based on the IgG level measured for each individual sample in the absence of peptidoglycan ligand. (Inset) All anti-*B. burgdorferi*-peptidoglycan (anti-$PG^{Bb}$) IgG values are shown as a bee-swarm plot for LA samples and controls (all non-LA samples). (B) Specificity of IgGs from LA synovial fluid samples for peptidoglycan from different bacteria. (C) Specificity of IgGs from control synovial fluid samples for different peptidoglycan types. (D) Comparison of IgG responses to $PG^{Bb}$ for serum and synovial fluid samples from patients with LA relative to those for serum from healthy humans and synovial fluid samples from control (non-LA) patients. (E) Correlation analysis of anti-PG$^{Bb}$ IgG responses between the serum and synovial fluid of patients with LA. The linear fit and Pearson correlation coefficient (r) for the LA synovial fluid samples are also shown.
Figure 2:
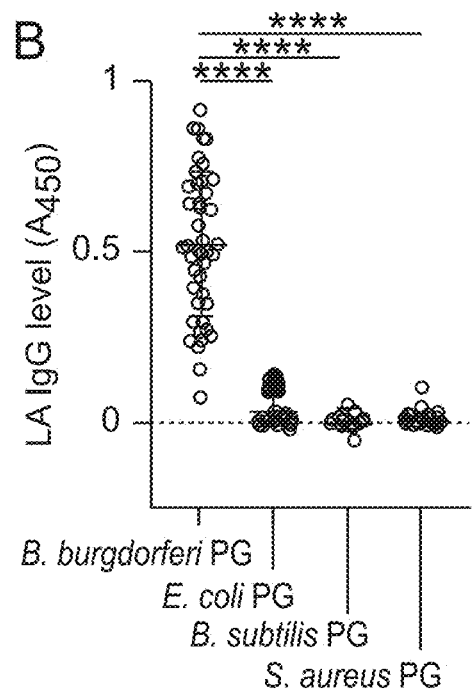
Figure 2:
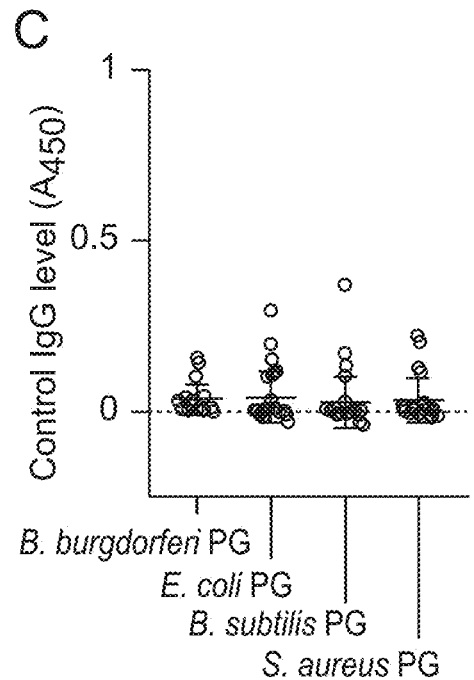
Figure 2:
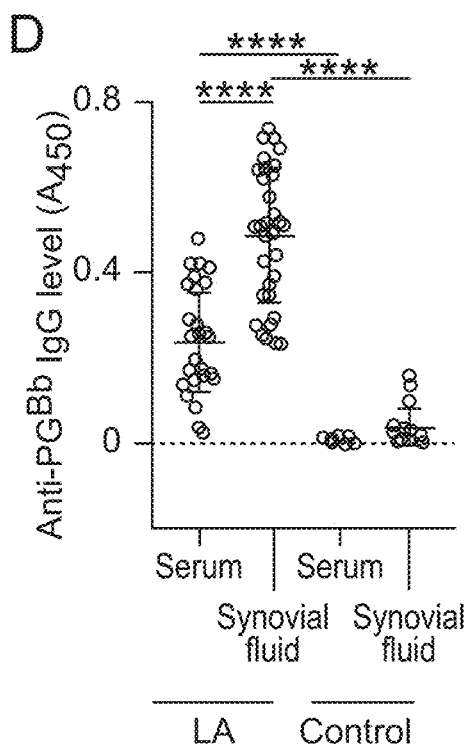
Figure 2:
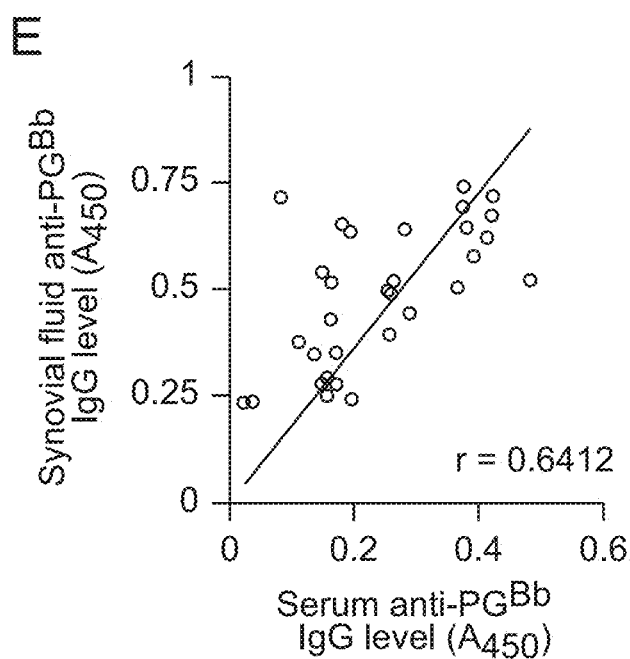

As shown in FIG. 2A, the synovial fluid of Lyme arthritis patients had high levels of IgG antibodies directed against the *B. burgdorferi* peptidoglycan compared to the control samples. And, as shown in FIG. 2B, the anti-peptidoglycan antibodies observed in the synovial fluid of the Lyme arthritis patients were specific to *B. burgdorferi* peptidoglycan. No significant levels of antibodies against the other bacterial peptidoglycans tested (i.e., *E. coli*, *B. subtilis*, and *S. aureus*) were observed in the Lyme arthritis patients. These results demonstrate that Lyme arthritis patients elicit detectable immune response specifically against *B. burgdorferi* peptidoglycan.

Example 3 Comparison of *B. burgdorferi* Peptidoglycan-Specific IgG Response in Synovial Fluid and Serum of Lyme Arthritis Patients To assess whether the anti-peptidoglycan antibodies can be observed in the sera of Lyme arthritis patients, both serum and synovial fluid samples were obtained from the Lyme arthritis patients of Example 2. Then, the levels of antibodies directed against the peptidoglycan of the following bacteria were assessed: *B. burgdorferi*, *E. coli*, *B. subtilis*, and *S. aureus* and assayed as described in Example 2.

As shown in FIGS. 2D and 2E, *B. burgdorferi* peptidoglycan-specific IgG antibodies were also detected in the serum of Lyme arthritis patients (including those that had received antibiotics orally (e.g., doxycycline or amoxicillin for 1 to 3.5 months) and both orally (e.g., doxycycline or amoxicillin for 1 to 3.5 months) and intravenously (e.g., ceftriaxone for 1 month)). While the levels were lower compared to those in synovial fluid samples, anti-peptidoglycan antibodies specific to *B. burgdorferi* were detectable in the serum in great majority of the patients. And, as observed in synovial fluid samples (see Example 2), the anti-peptidoglycan antibodies observed in the serum of Lyme arthritis patients were all specific to *B. burgdorferi* peptidoglycan. These results highlight the specificity of the anti-peptidoglycan antibodies to *B. burgdorferi* peptidoglycan and provides a calibration curve to quantitate absolute levels of *B. burgdorferi* peptidoglycan material in patient samples.

Figure 10:
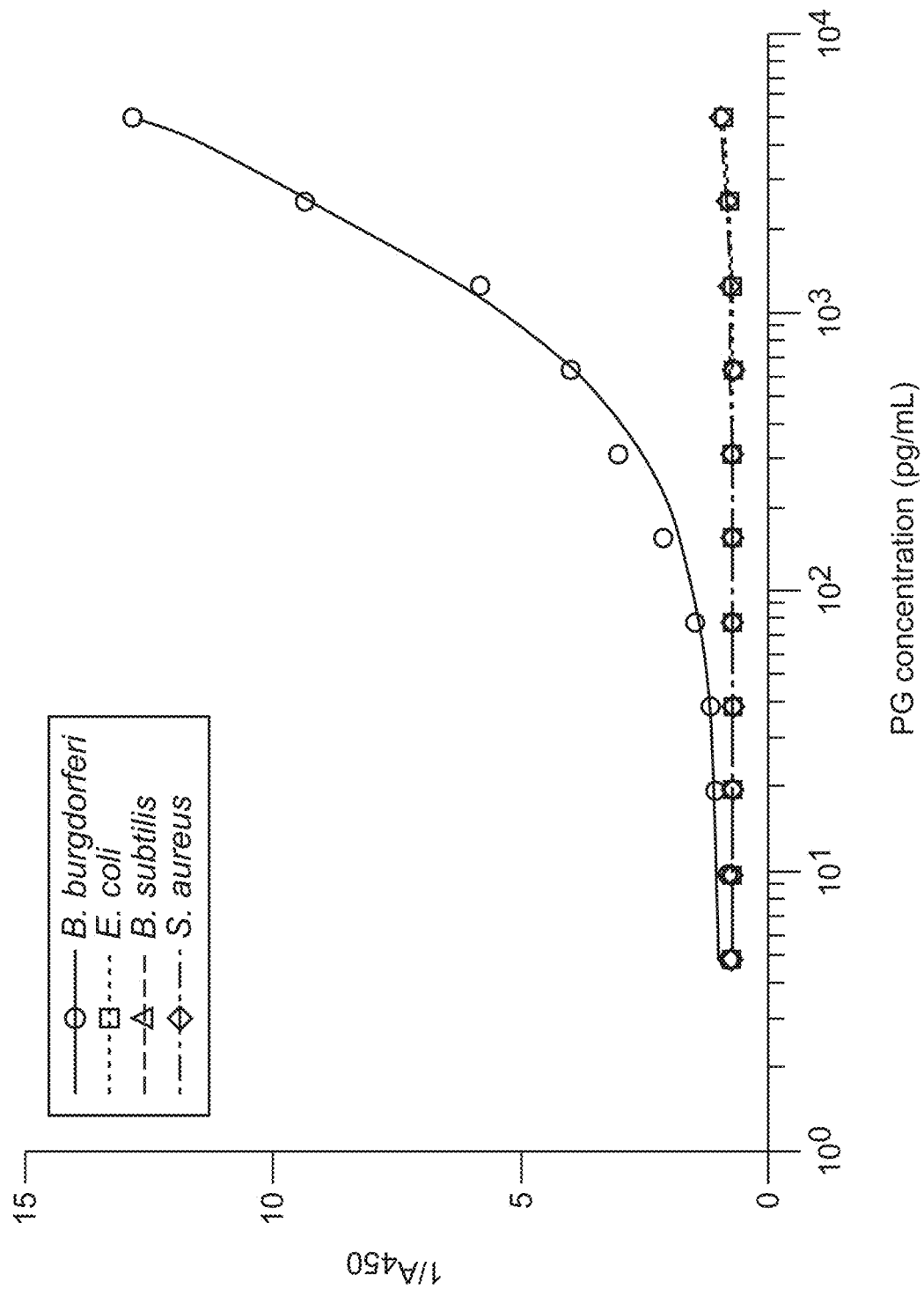
FIG. 10. Specificity and sensitivity of rabbit anti-serum raised against B. burgdorferi PG (anti-PG$^{Bb}$) using a competitive ELISA. PG$^{Bb}$-coated plates were incubated with titrations of known concentrations of PG purified from B. burgdorferi, E. coli, Staphylococcus aureus, and Bacillus subtilis that were pre-incubated with fixed amount of anti-PG$^{Bb}$ serum. Inverse spectrophotometric absorbance values are graphed as a function of PG concentrations (in pg/mL). A third-order polynomial equation (lines) was used to calculate the amount of PG in patient samples.
Figure 11:
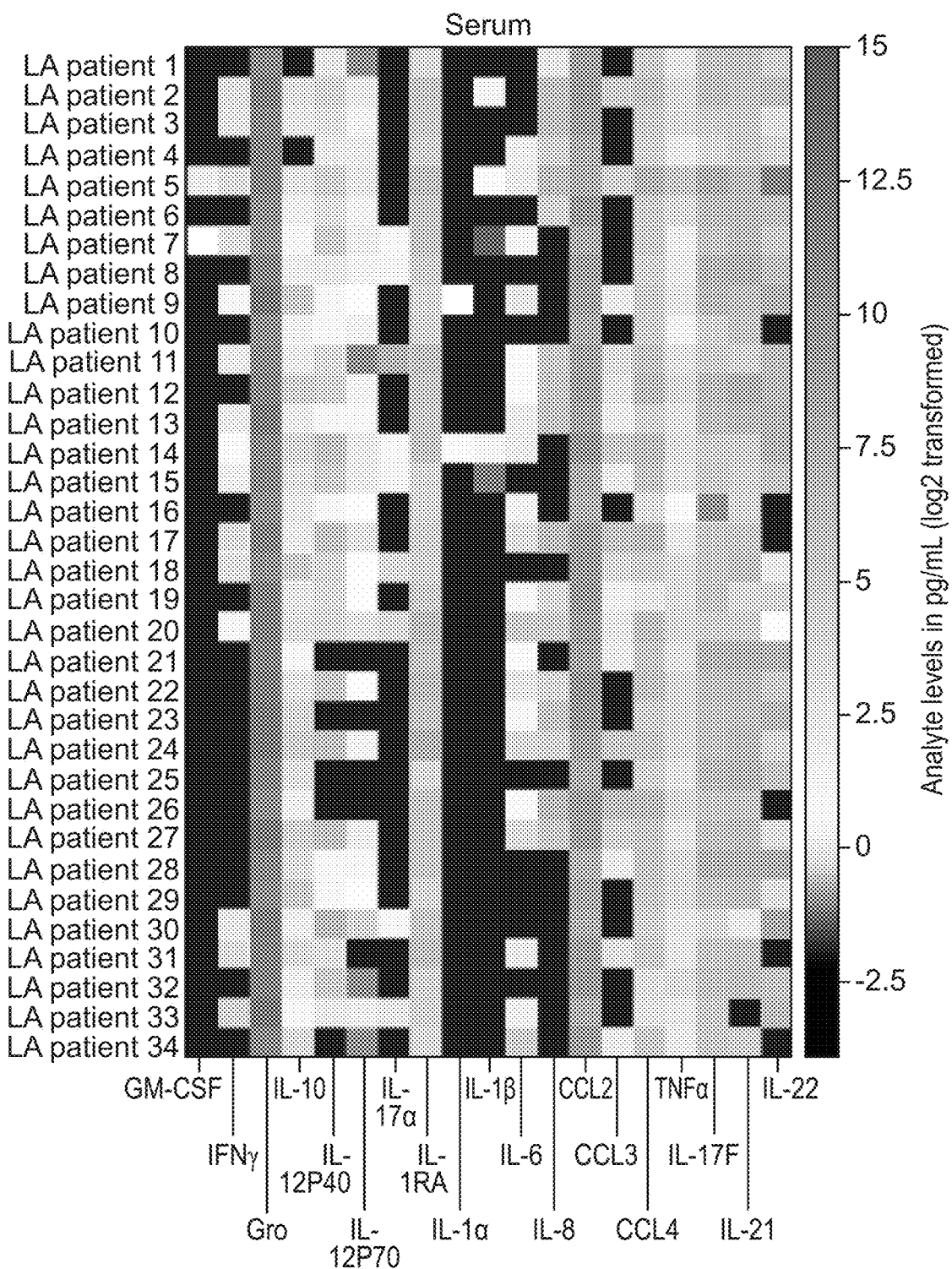
FIG. 11. Pairwise comparison of cytokine profiles in serum and synovial fluid samples of LA patients using Luminex bead arrays. Heat map values are the mean of replicate values in pg/mL of each analyte, followed by log2 transformation.
Figure 11:
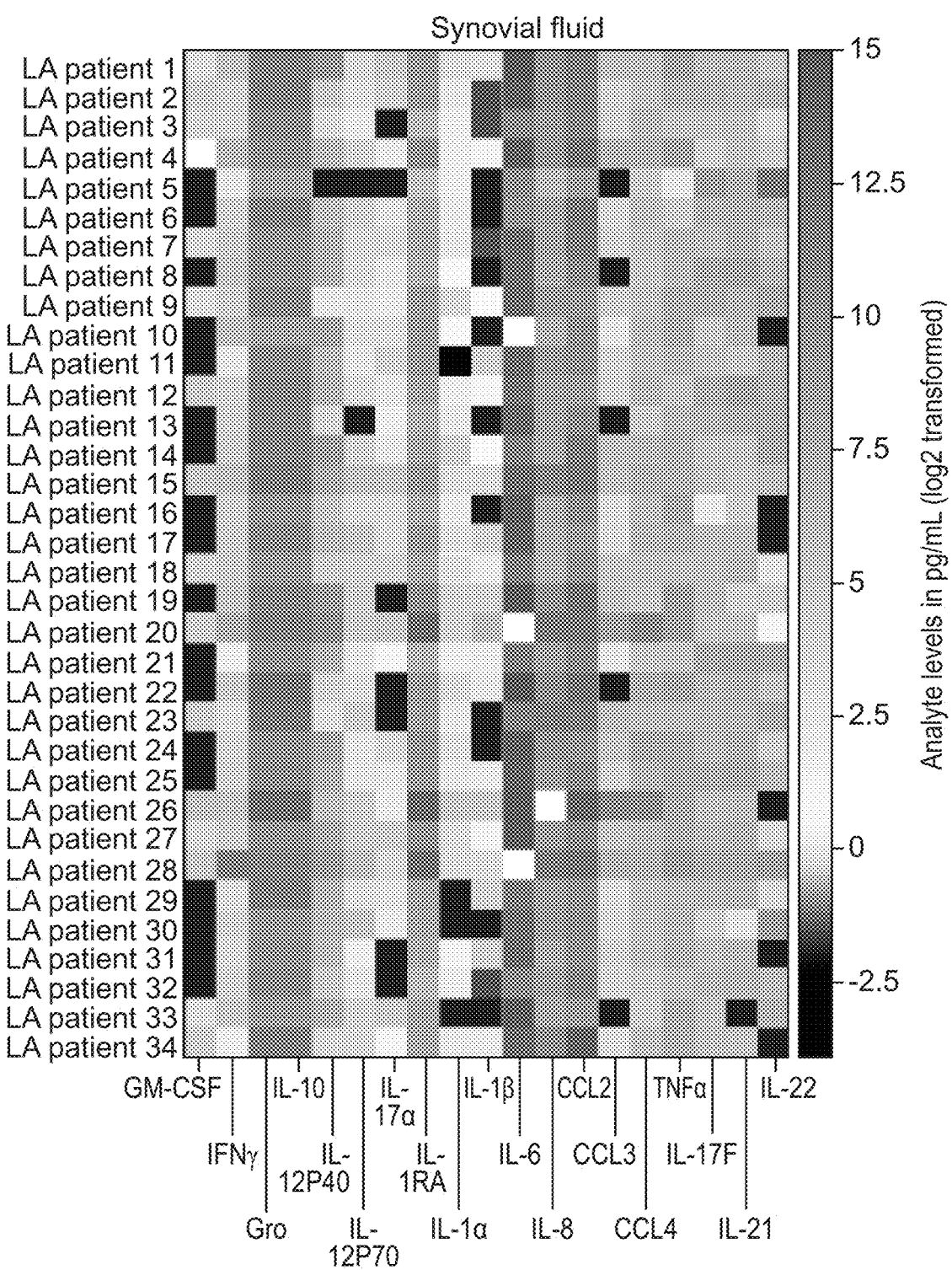

Example 5 Analysis of *B. burgdorferi* Peptidoglycan Level in Lyme Arthritis Patients To assess whether Lyme arthritis patients have detectable level of *B. burgdorferi* peptidoglycan, both the serum and synovial fluid were collected as described in Example 3. Synovial fluid from non-Lyme disease arthritis patients were used as controls. The levels of peptidoglycan material was assessed by competitive ELISA with anti-peptidoglycan antibody, and standard curves using purified *B. burgdorferi* peptidoglycan, as described in FIG. 10.

Figure 3:
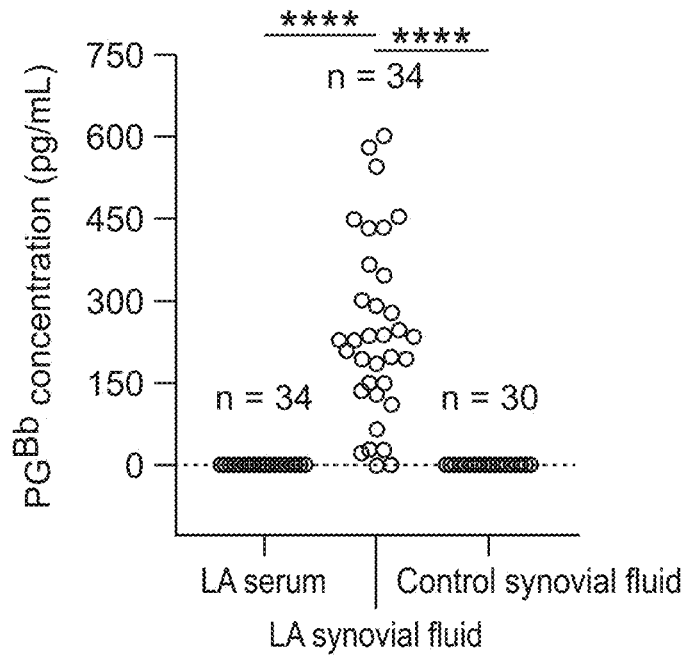
FIG. 3. Detection of PG$^{Bb}$ in synovial fluid samples of patients with LA. (A) Competitive ELISA using rabbit antiserum raised against PG$^{Bb}$ to quantify the concentration of PG (in picograms per milliliter) present in each sample. Horizontal black lines indicate means (****P<0.0001, Kruskal-Wallis test followed by Dunn's post hoc pairwise test). (B) Plot showing the PG$^{Bb}$ concentration of each sample as a function of its anti-PG$^{Bb}$ IgG level. The linear fit and the Pearson correlation coefficient (r) for the LA synovial fluid samples are also shown.
Figure 3:
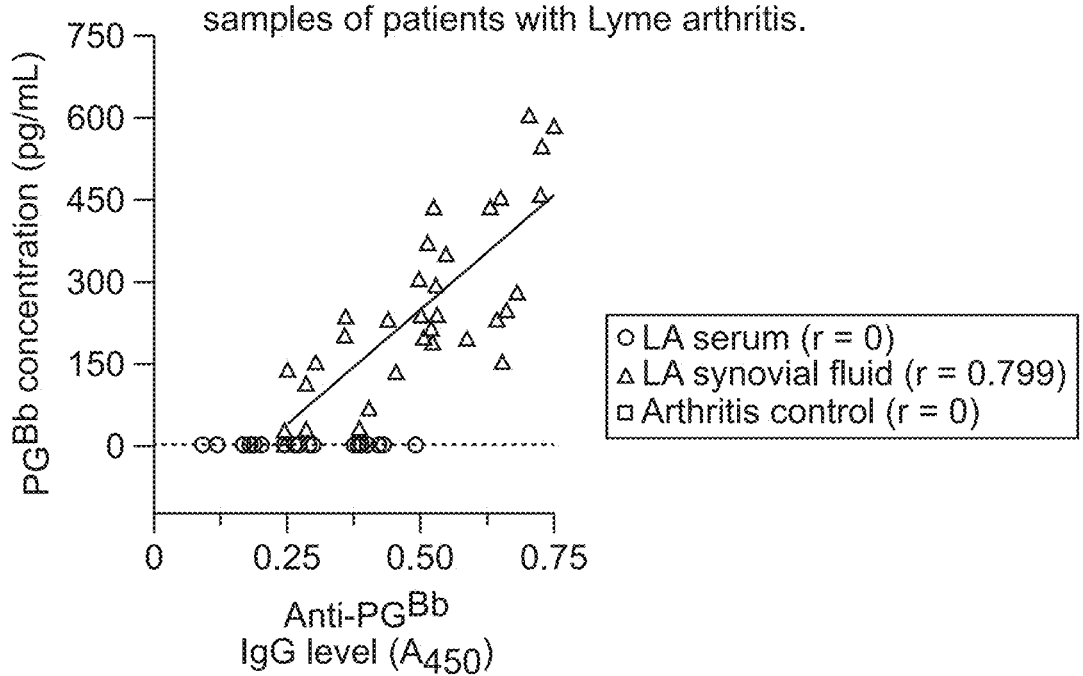

As shown in FIGS. 3A and 3B, significant level of *B. burgdorferi* peptidoglycan was observed in the synovial fluid of Lyme arthritis patients. The peptidoglycan amount in synovial fluid samples strongly correlated with the anti-peptidoglycan IgG level found in the same synovial sample (FIG. 3B). This result, in conjunction with the data shown in Example 1, demonstrate that *B. burgdorferi* sheds large amounts of antigenic peptidoglycan material during growth, which can be detected at least in the synovial fluid of Lyme arthritis patients.

Example 6 Analysis of the Ability of *B. burgdorferi* Peptidoglycan to Induce a Pro-Inflammatory Response To identify the possible role that *B. burgdorferi* peptidoglycan remnants have on Lyme arthritis, the levels of different pro-inflammatory mediators were measured in Lyme arthritis patients with matching serum and synovial fluid samples. Then, the ability of *B. burgdorferi* peptidoglycan to induce inflammatory mediators was measured by stimulating healthy human peripheral blood mononuclear cells (PBMCs) in vitro for approximately 72 hours. Following stimulation, culture supernatants were collected and, in tandem with patient samples, chemokines and cytokines levels were measured by Luminex bead array.

Figure 4:
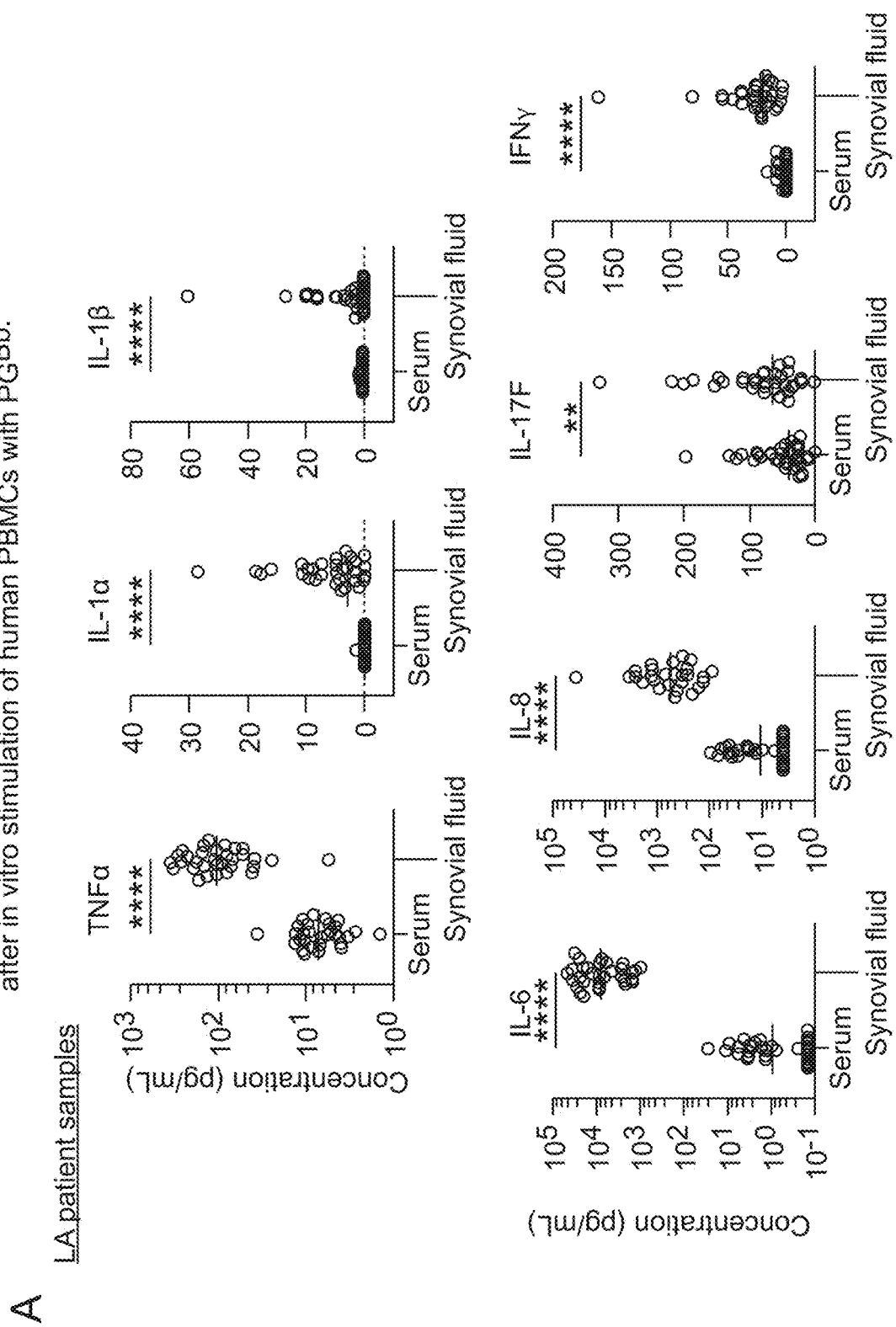
FIG. 4. Cytokine profile in serum and synovial fluid samples from patients with LA or after in vitro stimulation of human PBMCs with PG$^{Bb}$. (A) Bee-swarm plots showing levels of indicated cytokines in LA patient samples. Horizontal black lines indicate geometric means (**P<0.0001 and 0.001<P<0.01, Mann-Whitney U test). Pound signs indicate samples that yielded no signal but were included for completeness, as zero values cannot be displayed on log-scale axes. (B) Cytokine levels produced by control human PBMCs stimulated by PBS or 100 μg/mL polymeric PG (pPG) or mutanolysin-digested PG (dPG) for 72 h. All stimulatory studies were performed on pooled, mixed donor samples assayed in duplicate (mean±SD).
Figure 4:
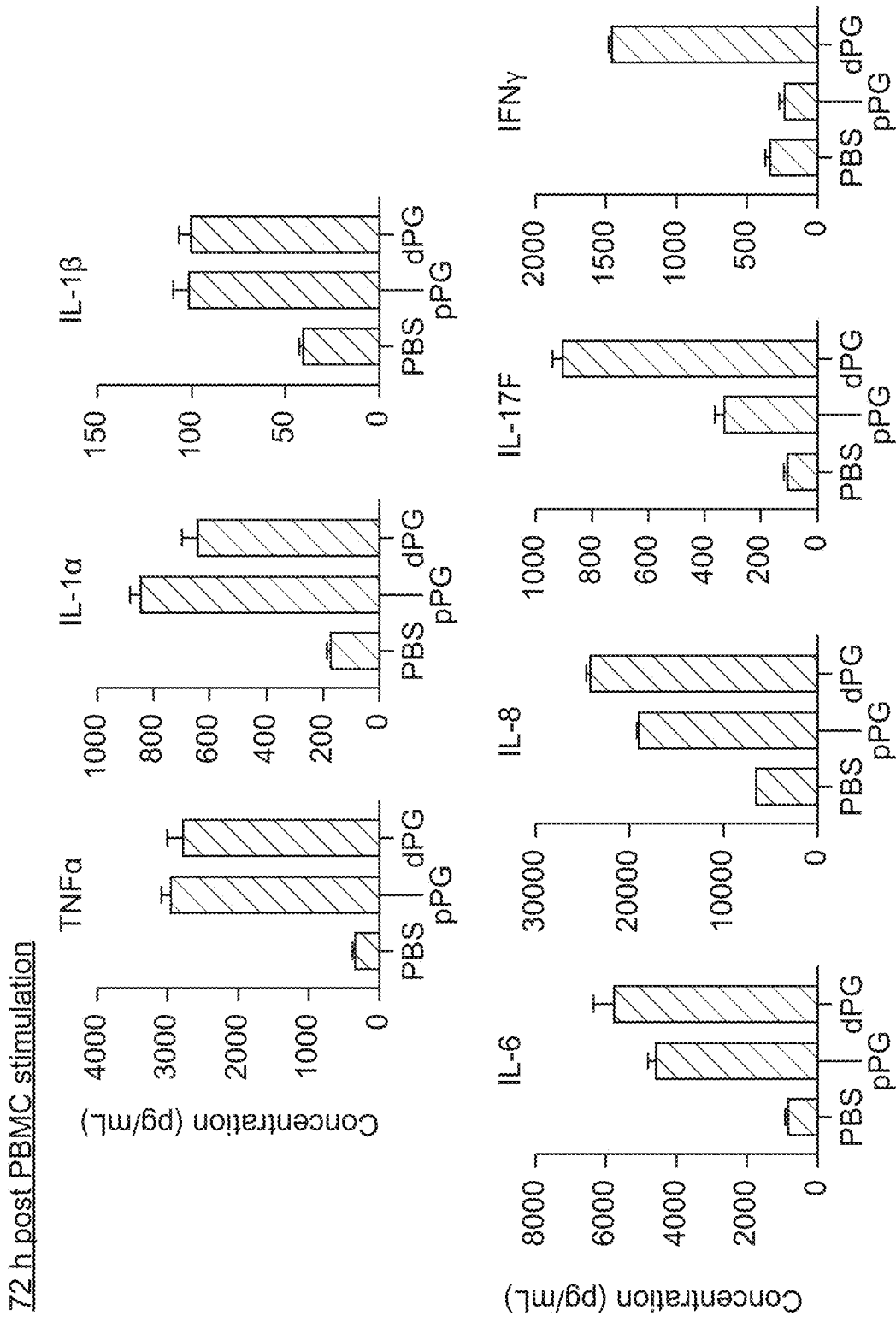
Figure 5:
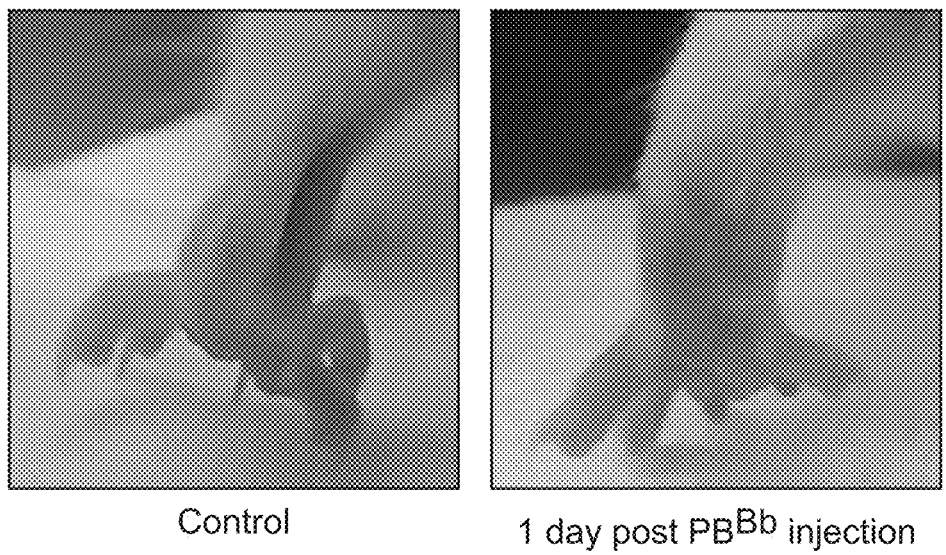
FIG. 5. Systemic administration of PG$^{Bb}$ induces acute arthritis in mice. (A) A BALB/c mouse 24 h after IV injection of 200 μg PG$^{Bb}$ exhibits bilateral ankle edema not present in an uninjected control mouse. (B) Average composite arthritis score (i.e., average sum of individual scores for left and right hind limbs) within each mouse group 24, 48, 72, and 96 h after IV administration of PG$^{Bb}$ or PBS. Error bars indicate SEMs; n=12 mice per group at 24 and 48 h post-injection and n=6 mice per group at all subsequent time points. (C) Arthritis prevalence as a function of time after injection with PG$^{Bb}$ or PBS. Only mice with a composite arthritis score ≥1 were considered as having arthritis. (D) Sum of left and right ankle histopathological scores for individual mice at 48 or 96 h after IV injection of PG$^{Bb}$ or PBS. Horizontal black lines indicate means and SEM (**P<0.01 and *0.01<P<0.05, respectively, Mann-Whitney U test). (E) Representative light micrographs of hematoxylin-eosin-stained sections of mouse ankles collected 48 or 96 h after IV administration of PG$^{Bb}$ show peritendon inflammation (single pound symbols) and synovial space edema (double pound symbols). PBS-injected control mice lack both histopathological features when examined at the same time points.
Figure 5:
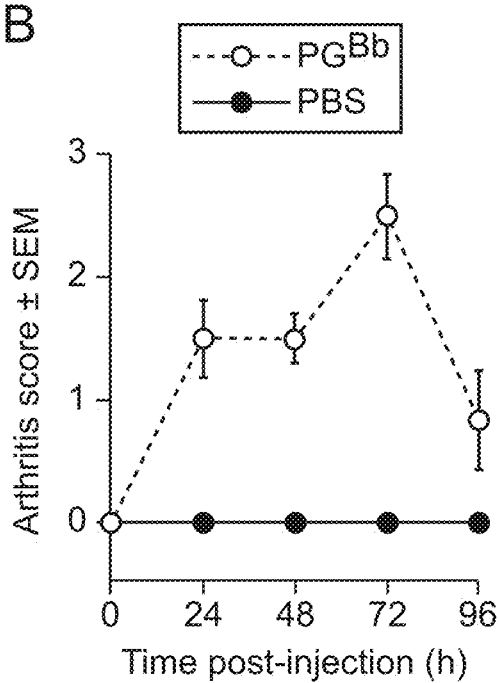
Figure 5:
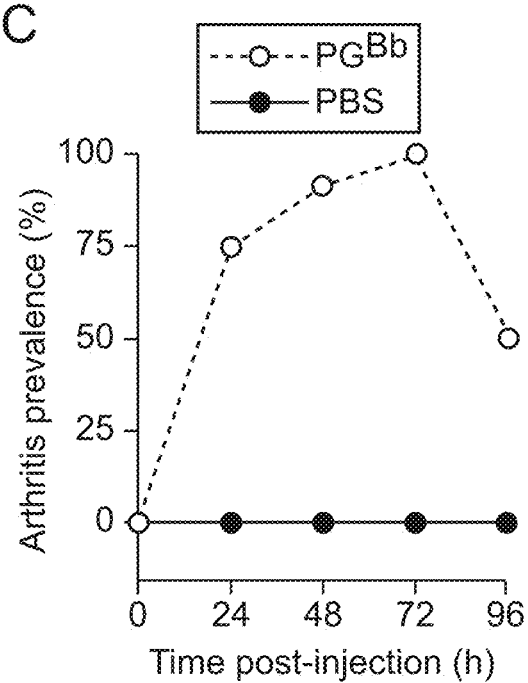
Figure 5:
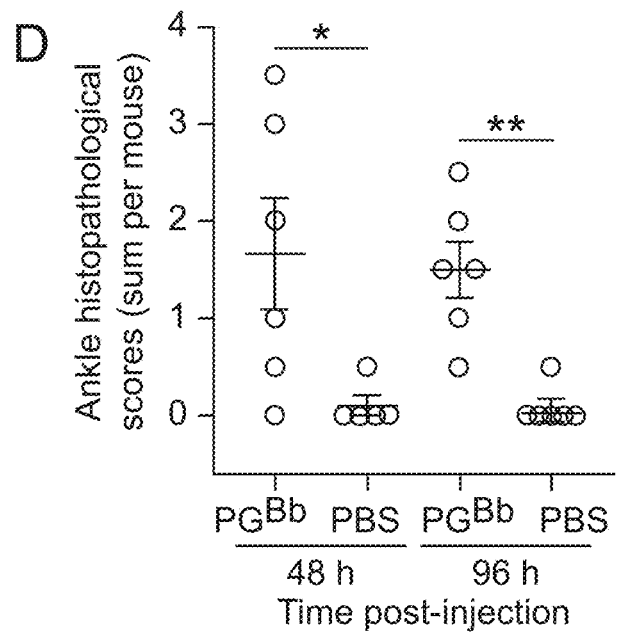
Figure 5:
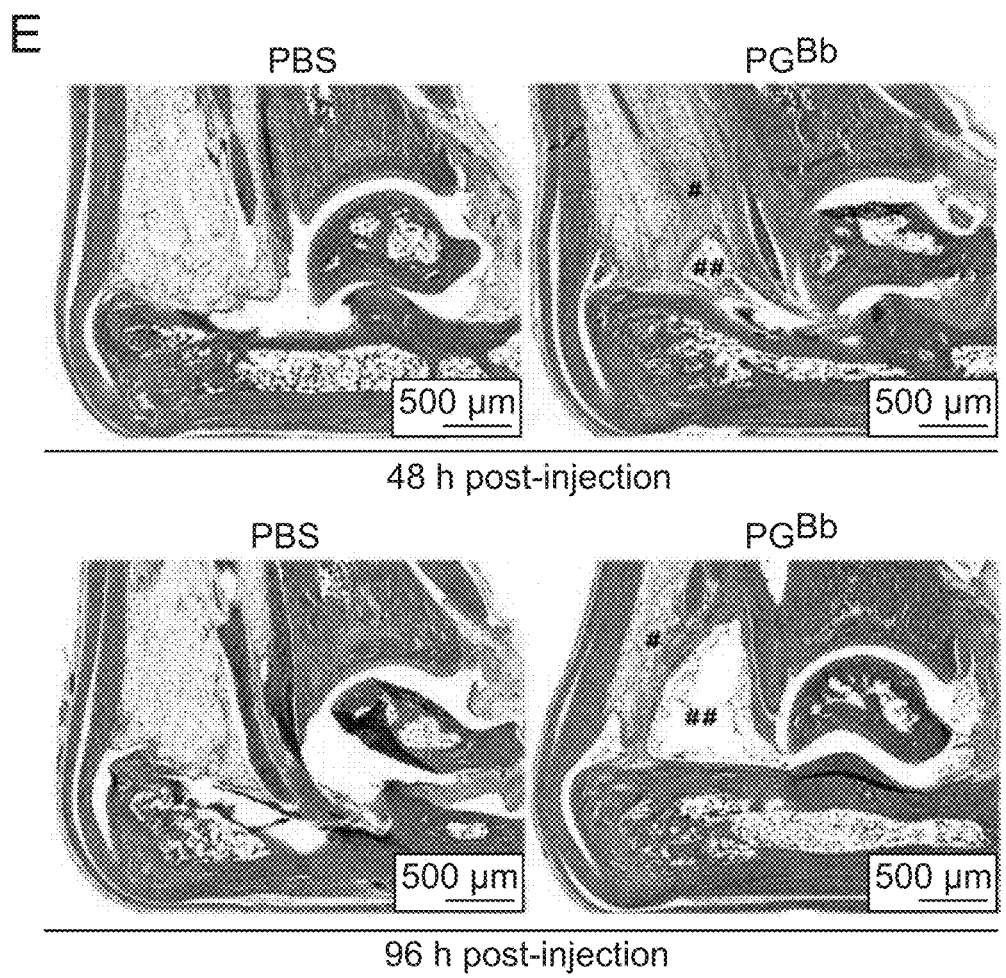
Figure 6:
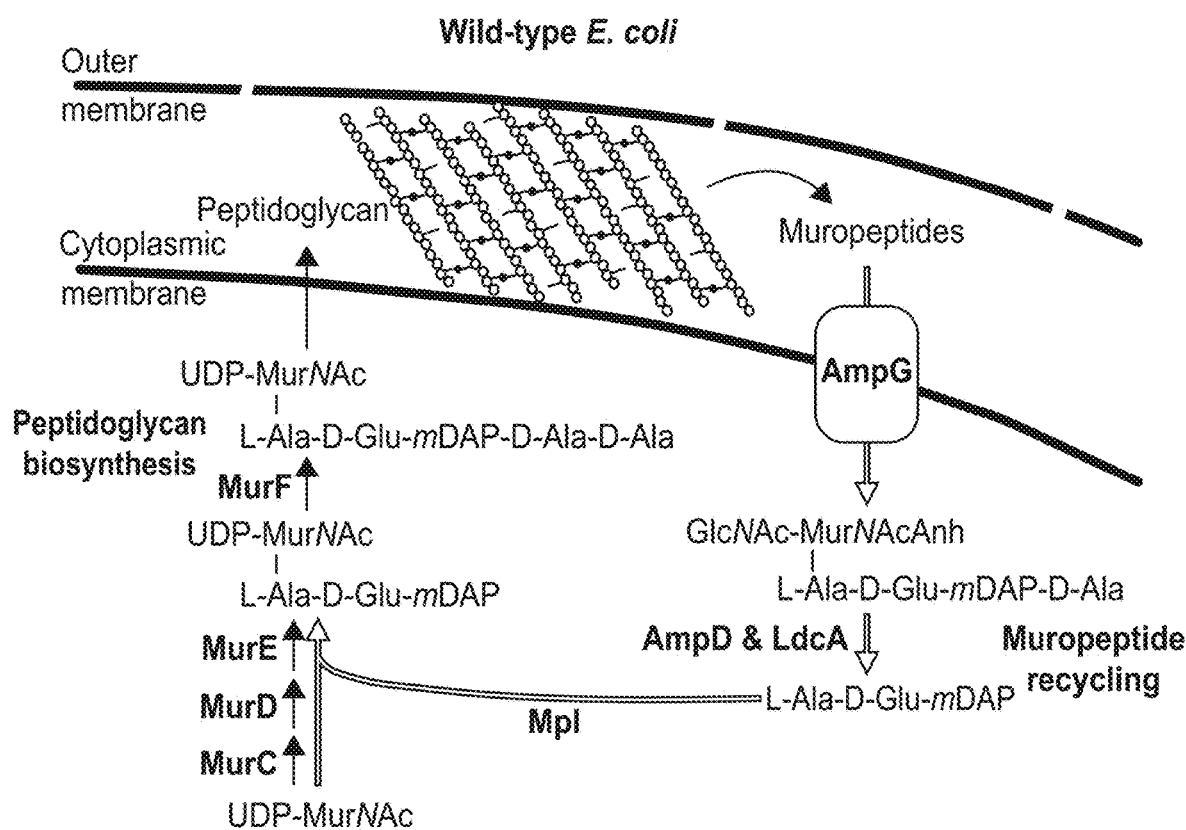
FIG. 6. Fate of muropeptides in wild-type and ΔampG mutant strains of Escherichia coli. (A) Schematic showing the pathway involved in recycling the peptide moiety of the peptidoglycan (PG) of wild-type E. coli (and other Gram-negative bacteria) into the cytoplasmic PG biosynthetic pathway. (B) Schematic showing that the majority of muropeptides generated during normal PG turnover are released into the environment in a ΔampG mutant of E. coli. (C) Sequence homology search analysis showing that B. burgdorferi lacks apparent homologs of PG recycling proteins found in E. coli. Homology searches were performed using BLASTP's default parameters and a query sequence retrieved from NCBI's RefSeq database for each of the E. coli K-12 MG1655 proteins shown.
Figure 6:
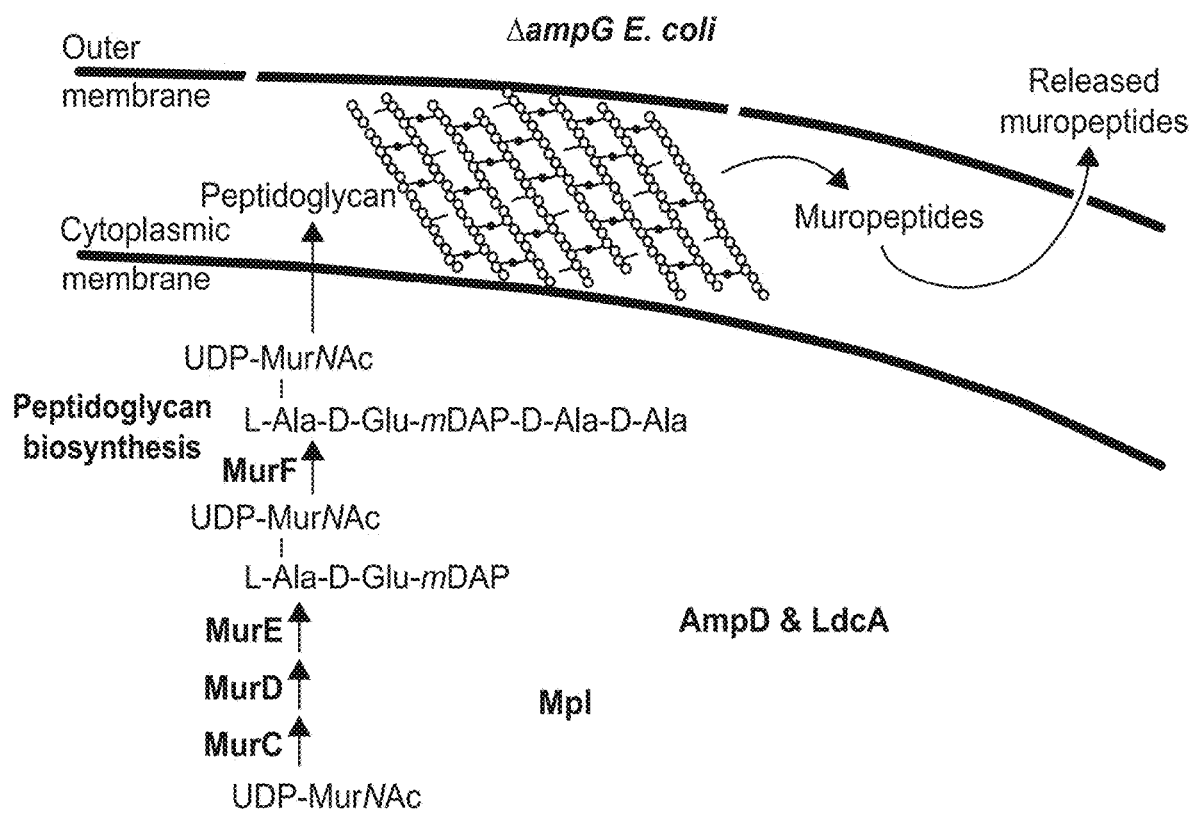
Figure 7:
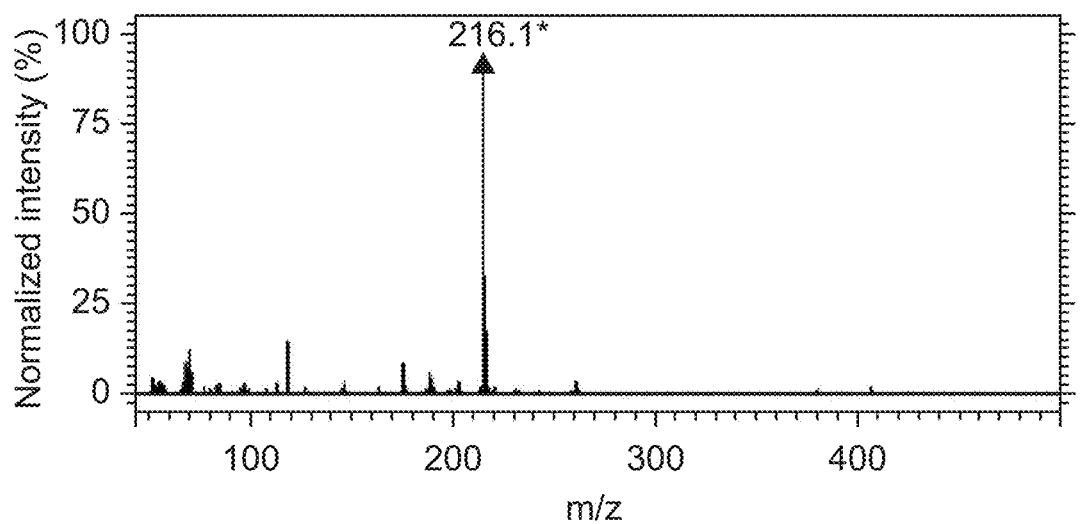
FIG. 7. Verification of the presence of ornithine in PG$^{Bb}$. (A) Electron impact mass spectrum (normalized intensity versus mass-to-charge ratio (m/z)) showing the presence of Orn in PG$^{Bb}$. Gas chromatography (GC) coupled to mass spectrometry (MS) proved the identity of N-pentafluoropropionyl ornithine isopropylester obtained from the hydrolysat (4N HCl, 100° C., 16 h) of PG$^{Bb}$ by the characteristic cyclic imminium fragment-ion at 216 m/z (shown by the asterisk), in agreement with data of the authentic standard substance. (B) Analysis of radiolabeled PG$^{Bb}$. Shown are chromatograms of cellosyl-digested PG$^{Bb}$ labeled with $^3$H-L-Orn. Muropeptides were detected by UV absorbance or liquid scintillation in counts per minute (CPM).
Figure 7:
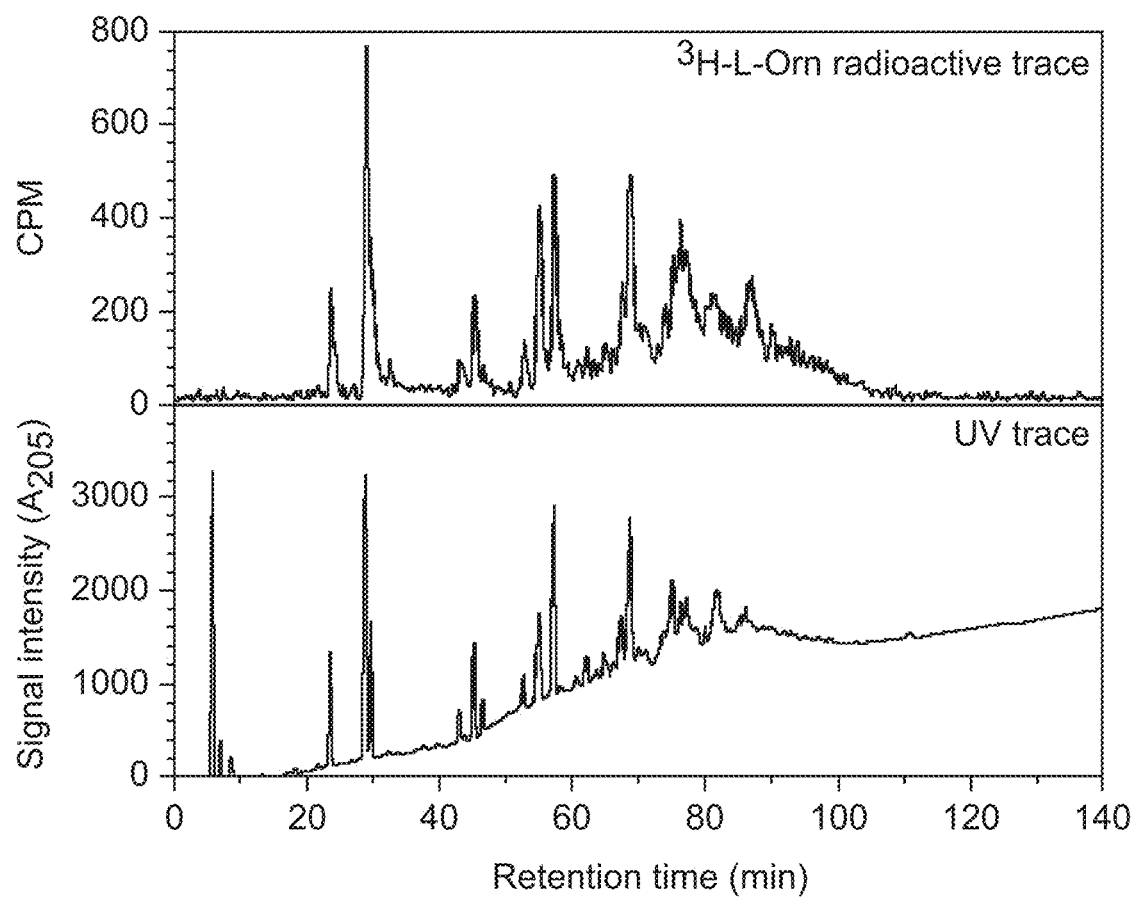

As shown in FIG. 4A, both the serum and the synovial fluid of Lyme arthritis patients had detectable levels of pro-inflammatory markers (TNF-α, IL-1α, IL-1β, IL-6, IL-8, IFN-γ, and IL-17F). Similar to the levels of *B. burgdorferi* peptidoglycan and anti-peptidoglycan described earlier, most inflammatory mediators were consistently higher in the synovial fluid compared to the serum. As shown in FIG. 4B, *B. burgdorferi* peptidoglycan stimulation was able to induce the production of various inflammatory mediators in human PBMCs. Collectively, these results suggest that *B. burgdorferi* peptidoglycan material is likely a major contributor for the inflammatory conditions observed in many Lyme arthritis patients.

Figure 12:
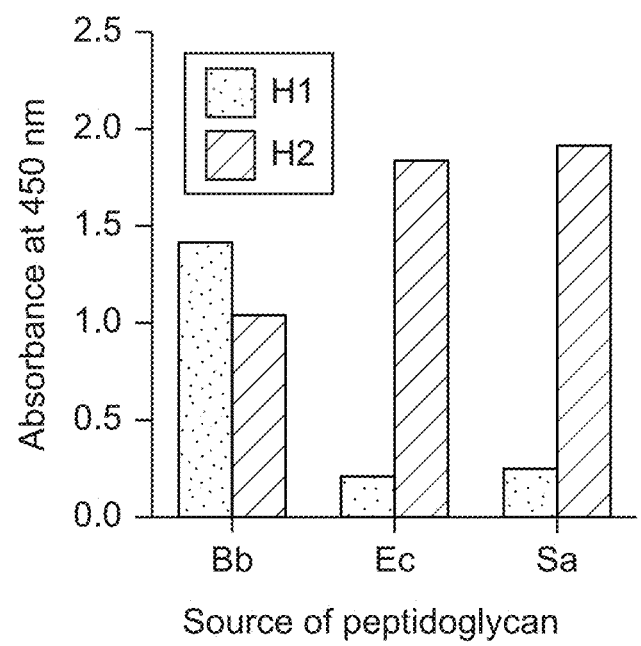
FIG. 12. Mouse hybridoma cells lines, named 'H1' and 'H2', are capable of producing monoclonal antibodies that recognize peptidoglycan (PG). The antibody produced by the H1 hybridoma shows high selectivity toward peptidoglycan (PG) of the Lyme agent Borrelia burgdorferi (Bb). In contrast, the antibody derived from the H2 hybridoma is capable of binding to a broader set of peptidoglycans. The specificity of the antibody was tested in an enzyme-linked immunosorbent assay (ELISA) with various types of peptidoglycan isolated from different bacteria. B. burgdorferi peptidoglycan contains ornithine at the third position of the stem peptide, while S. aureus (Sa) and E. coli (Ec) peptidoglycan contain lysine and meso-diaminopimelic acid, respectively. The amount of peptidoglycan-bound antibody is quantified based on the absorbance value at 450 nm. This assay demonstrates that the monoclonal antibodies produced by H1 and H2 hybridoma cell lines recognize different epitopes, which is valuable in diagnosis for both species-specific and general peptidoglycan.

Example 7 Analysis of the Ability of Mouse Monoclonal Antibodies to Recognize Peptidoglycan of Different Bacterial Origin As shown in FIG. 12, mouse hybridoma cells lines, named 'H1' and 'H2', capable of producing monoclonal antibodies were identified for their ability of recognizing peptidoglycan. The antibody produced by the H1 hybridoma shows high selectivity toward peptidoglycan of *B. burgdorferi* (Bb). In contrast, the antibody derived from the H2 hybridoma is capable of binding to a broader set of peptidoglycans. The specificity of the antibody was tested in an enzyme-linked immunosorbent assay (ELISA) with various types of peptidoglycan isolated from different bacteria. *B. burgdorferi* peptidoglycan contains ornithine at the third position of the stem peptide, while *S. aureus* (Sa) and *E. coli* (Ec) peptidoglycan contain lysine and meso-diaminopimelic acid, respectively. The amount of peptidoglycan-bound antibody was quantified based on the absorbance value at 450 nm. This assay demonstrates that the monoclonal antibodies produced by H1 and H2 hybridoma cell lines recognize different epitopes, a valuable property for developing test for both species-specific and general peptidoglycan.

Figure 13:
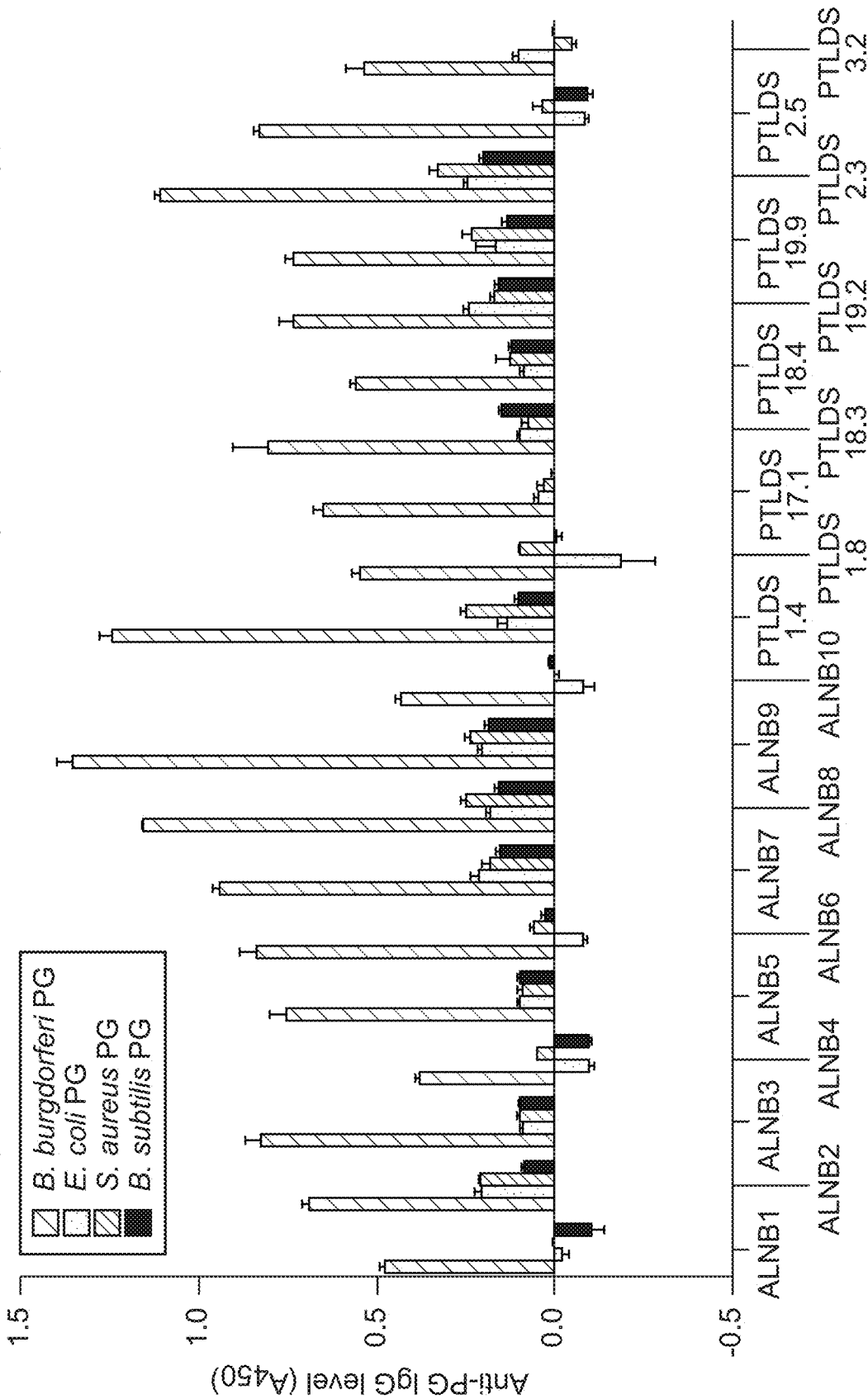
FIG. 13. Lyme neuroborreliosis patients have IgG antibodies against B. burgdorferi peptidoglycan at the acute stage (time of diagnosis) and after antibiotic treatment. IgG levels in serum samples of Lyme neuroborreliosis patients were blindly determined using an ELISA. Ten serum samples were collected from patients at an acute stage of Lyme neuroborreliosis (ALNB). The other samples were from four patients (PTLDS 1 to 4) after the indicated number of weeks of antibiotic treatment (doxycycline orally or doxycycline and ceftriaxone by IV). For example, PTLDS 1.4 and 1.8 are from patient 1 after 4 and 8 weeks of treatment, respectively. PTLDS 17.1 is from patient 17 after 1 week of therapy, etc. For the ELISA, purified peptidoglycan (PG) from different bacteria, B. burgdorferi (B. burg), E. coli, S. aureus and B. subtilis (B. subtil), was used to coat poly-lysine-treated microtiter plates at a concentration of 100 µg/mL. IgG levels were determined in absorbance unit at 450 nm ($A_{450}$). Values were background-subtracted based on IgG level measured for each individual sample in the absence of the PG ligand. The patient samples were obtained from Dr. Adriana Marques, MD (Chief of the Lyme Disease Studies Unit at the Laboratory of Clinical Immunology and Microbiology, National Institute of Allergy and Infectious Diseases).

Example 8 Comparison of IgG Response to Different Types of Bacterial Peptidoglycan in Lyme Neuroborreliosis Patients As shown in FIG. 13, Lyme neuroborreliosis patients have IgG antibodies against *B. burgdorferi* peptidoglycan at the acute stage (time of diagnosis) and after antibiotic treatment. IgG levels in serum samples of Lyme neuroborreliosis patients were blindly determined using an ELISA. Ten serum samples were collected from patients at an acute stage of Lyme neuroborreliosis (ALNB). The other samples were from four patients (PTLDS 1 to 4) after the indicated number of weeks of antibiotic treatment (doxycycline orally or doxycycline and ceftriaxone by IV). For example, PTLDS 1.4 and 1.8 are from patient 1 after 4 and 8 weeks of treatment, respectively. PTLDS 17.1 is from patient 17 after 1 week of therapy, etc. For the ELISA, purified peptidoglycan (PG) from different bacteria, *B. burgdorferi* (*B. burg*), *E. coli*, *S. aureus* and *B. subtilis* (*B. subtil*), was used to coat poly-lysine-treated microtiter plates at a concentration of 100 µg/mL. IgG levels were determined in absorbance unit at 450 nm ($A_{450}$). Values were background-subtracted based on IgG level measured for each individual sample in the absence of the PG ligand. The patient samples were obtained from Dr. Adriana Marques, MD (Chief of the Lyme Disease Studies Unit at the Laboratory of Clinical Immunology and Microbiology, National Institute of Allergy and Infectious Diseases).

These data, together with the data from the Lyme arthritis patients, show that an IgG response specific to *B. burgdorferi* peptidoglycan is observed in Lyme disease patients with different clinical manifestations before and after antibiotic therapy.

It is to be appreciated that the Detailed Description section, and not the Summary and Abstract sections, is intended to be used to interpret the claims. The Summary and Abstract sections can set forth one or more but not all exemplary embodiments of the present disclosure as contemplated by the inventor(s), and thus, are not intended to limit the present disclosure and the appended claims in any way.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

All publications, patents, patent applications, internet sites, and accession numbers/database sequences (including both polynucleotide and polypeptide sequences) cited herein are hereby incorporated by reference in their entirety for all purposes to the same extent as if each individual publication, patent, patent application, internet site, or accession number/database sequence were specifically and individually indicated to be so incorporated by reference.

What is claimed is:

1. A method of diagnosing Lyme disease arthritis in a subject in need thereof comprising:
    (i) contacting, with a synovial fluid sample of the subject, an innate immunity protein that binds to *Borrelia burgdorferi* peptidoglycan, wherein the innate immunity protein is NOD2;
    (ii) detecting binding between NOD2 and peptidoglycan; and
    (iii) measuring the level of peptidoglycan in the sample based at least upon the amount of binding detected between NOD2 and peptidoglycan.

2. The method of claim 1, wherein the synovial fluid sample of the subject has a greater level of peptidoglycan compared to a reference control sample.

3. The method of claim 2, wherein the level of peptidoglycan in the synovial fluid sample of the subject is greater than at least about 5%, at least about 10%, at least about 20%, at least about 30%, at least about 40%, at least about 50%, at least about 60%, at least about 70%, at least about 80%, at least about 90%, at least about 100%, at least about 150%, at least about 200%, at least about 300% or more compared to a corresponding level in the reference sample.

4. The method of claim 1, wherein the contacting, detecting and measuring are performed in vitro.

5. The method of claim 1, further comprising treating the subject with one or more therapeutic agents, wherein treating occurs after diagnosing.

6. The method of claim 5, wherein the one or more therapeutic agents comprises a therapeutically effective amount of an antibiotic.

7. The method of claim 6, wherein the antibiotic comprises doxycycline, amoxicillin, ceftriaxone, or combinations thereof.

8. The method of claim 1, wherein the contacting is performed within about 3 weeks after suspected infection with *Borrelia burgdorferi*.

9. The method of claim 1, wherein the subject in need thereof has been previously diagnosed with Lyme disease.

* * * * *